(12) United States Patent
Bonamico et al.

(10) Patent No.: US 11,445,718 B2
(45) Date of Patent: Sep. 20, 2022

(54) ROTATING ATOMIZER DEVICE FOR APPLICATION IN APPARATUS FOR LAND SPRAYING

(71) Applicant: Mercedes BONAMICO, Laboulaye (AR)

(72) Inventors: Guillermo Luis Bonamico, Laboulaye (AR); Guillermo Ever Brizzio, General Levalle (AR)

(73) Assignee: Mercedes Bonamico, Laboulaye (AR)

( * ) Notice: Subject to any disclaimer, the term of this patent is extended or adjusted under 35 U.S.C. 154(b) by 212 days.

(21) Appl. No.: 16/315,517

(22) PCT Filed: Jul. 3, 2017

(86) PCT No.: PCT/EP2017/066508
§ 371 (c)(1),
(2) Date: Jan. 4, 2019

(87) PCT Pub. No.: WO2018/007321
PCT Pub. Date: Jan. 11, 2018

(65) Prior Publication Data
US 2019/0313623 A1     Oct. 17, 2019

(30) Foreign Application Priority Data

Jul. 4, 2016  (AR) .............................. 20160102019

(51) Int. Cl.
*A01M 7/00* (2006.01)
*B05B 3/02* (2006.01)
*B05B 1/22* (2006.01)

(52) U.S. Cl.
CPC .......... *A01M 7/0021* (2013.01); *A01M 7/001* (2013.01); *B05B 3/02* (2013.01); *B05B 1/22* (2013.01)

(58) Field of Classification Search
CPC .. A01M 7/0021; A01M 7/001; A01M 7/0003; A01M 7/0014; A01M 7/0028;
(Continued)

(56) References Cited

U.S. PATENT DOCUMENTS 4,539,932 A * 9/1985 Vecellio .................... B05B 5/04
                                                    118/622
5,248,448 A * 9/1993 Waldron ................... B05B 7/10
                                                    239/338
(Continued)

FOREIGN PATENT DOCUMENTS

CN     102083352 A    6/2011
CN     203620824 U    6/2014
(Continued)

OTHER PUBLICATIONS

International Search Report dated Oct. 13, 2017 re: Application No. PCT/EP2017/066508, pp. 1-3, citing: US 2002/100815 A1, CN 102 083 352 A and WO 2016/192024 A1.
(Continued)

*Primary Examiner* — Steven M Cernoch
(74) *Attorney, Agent, or Firm* — Defillo & Associates, Inc; Evelyn A. Defillo

(57) ABSTRACT

A rotating atomizer device is provided that allows the correction of eventual separations that the random variations (of climatic and/or environmental nature) may cause in the final result of the phytosanitary treatment so that the application of the chemical products is done completely in agreement with what has been prescribed by the agronomic professional, achieving a greater efficiency of the phytosanitary spraying process.

5 Claims, 34 Drawing Sheets

Figure 1:
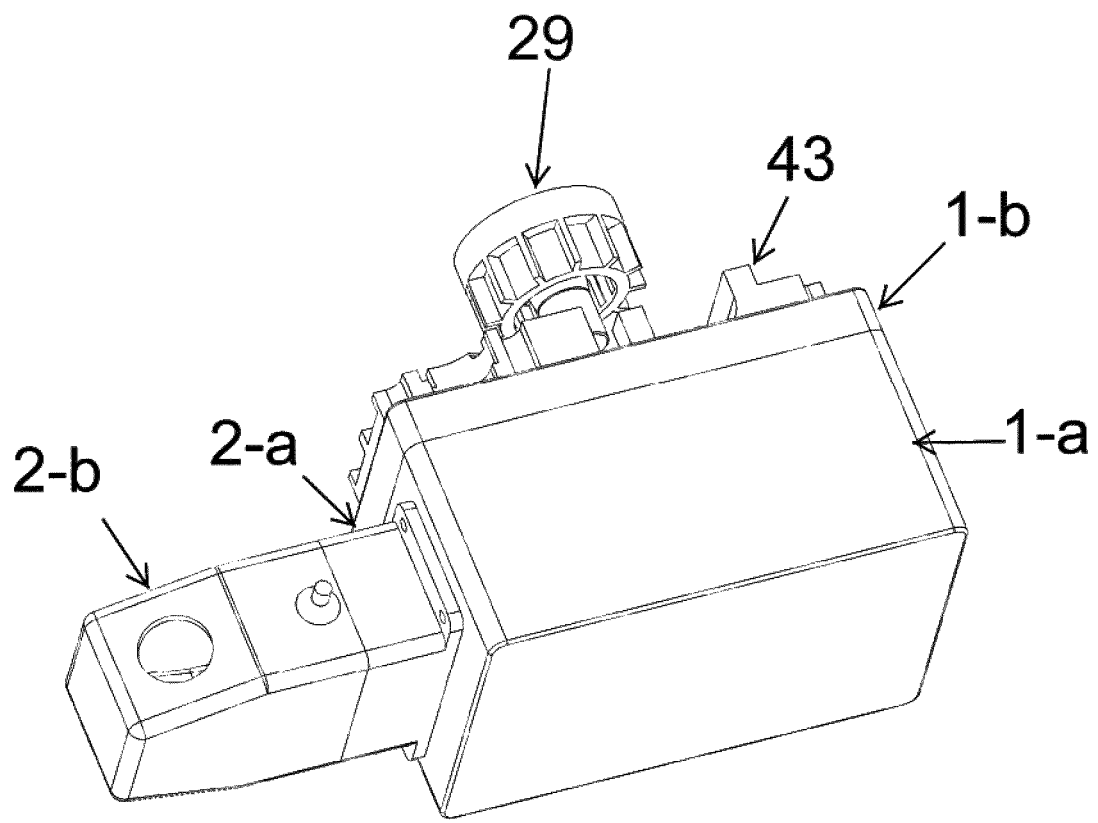
Figure 2:
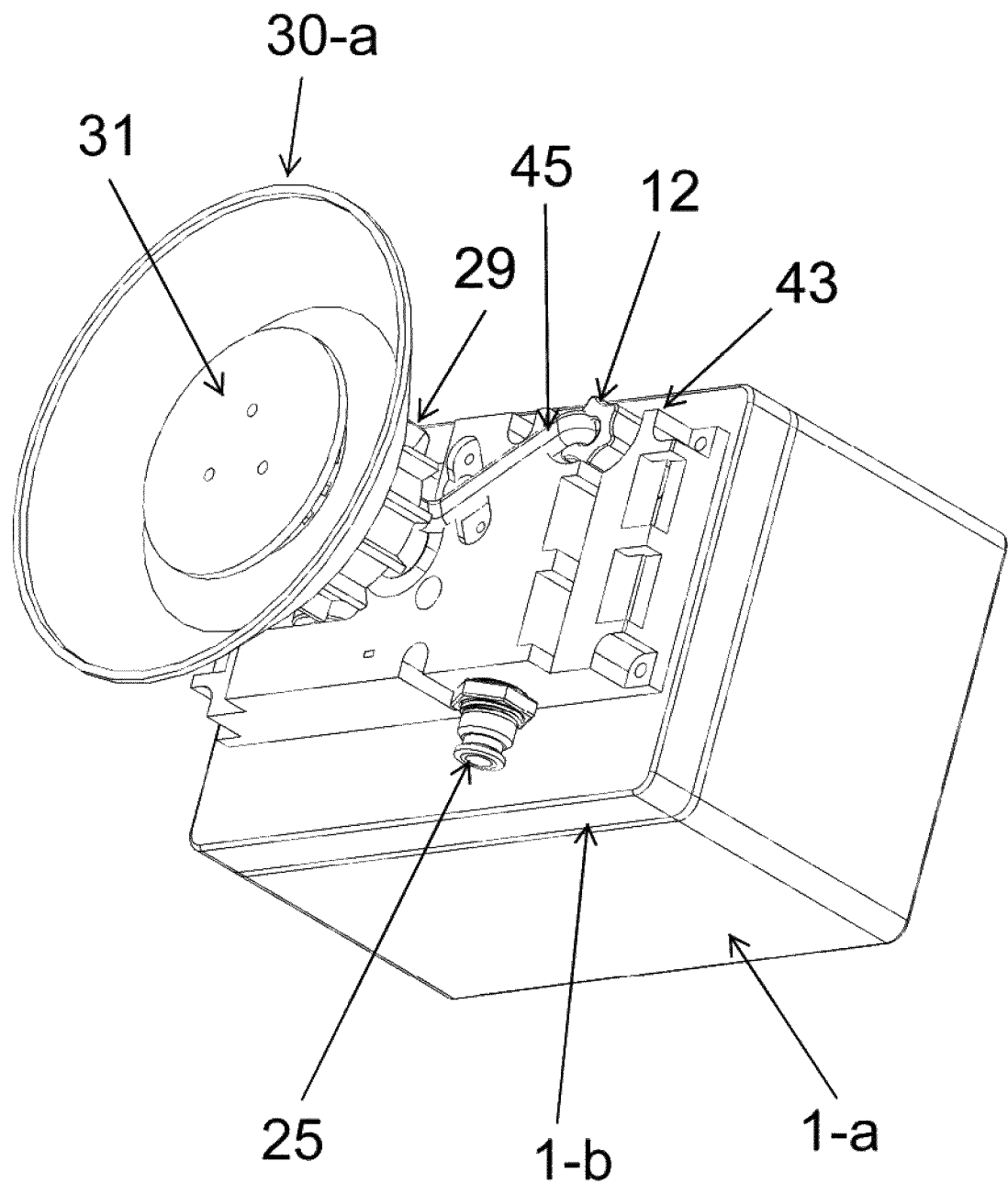
Figure 3:
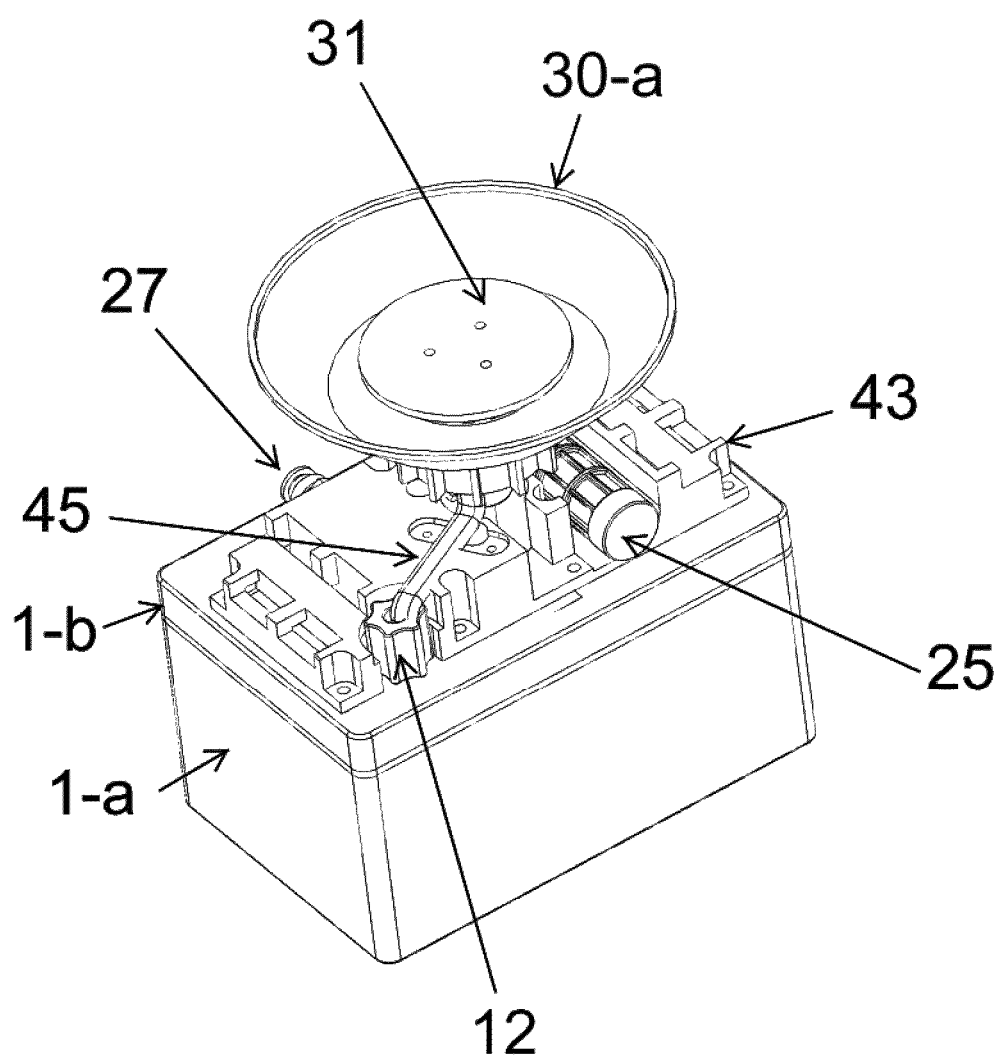
Figure 4:
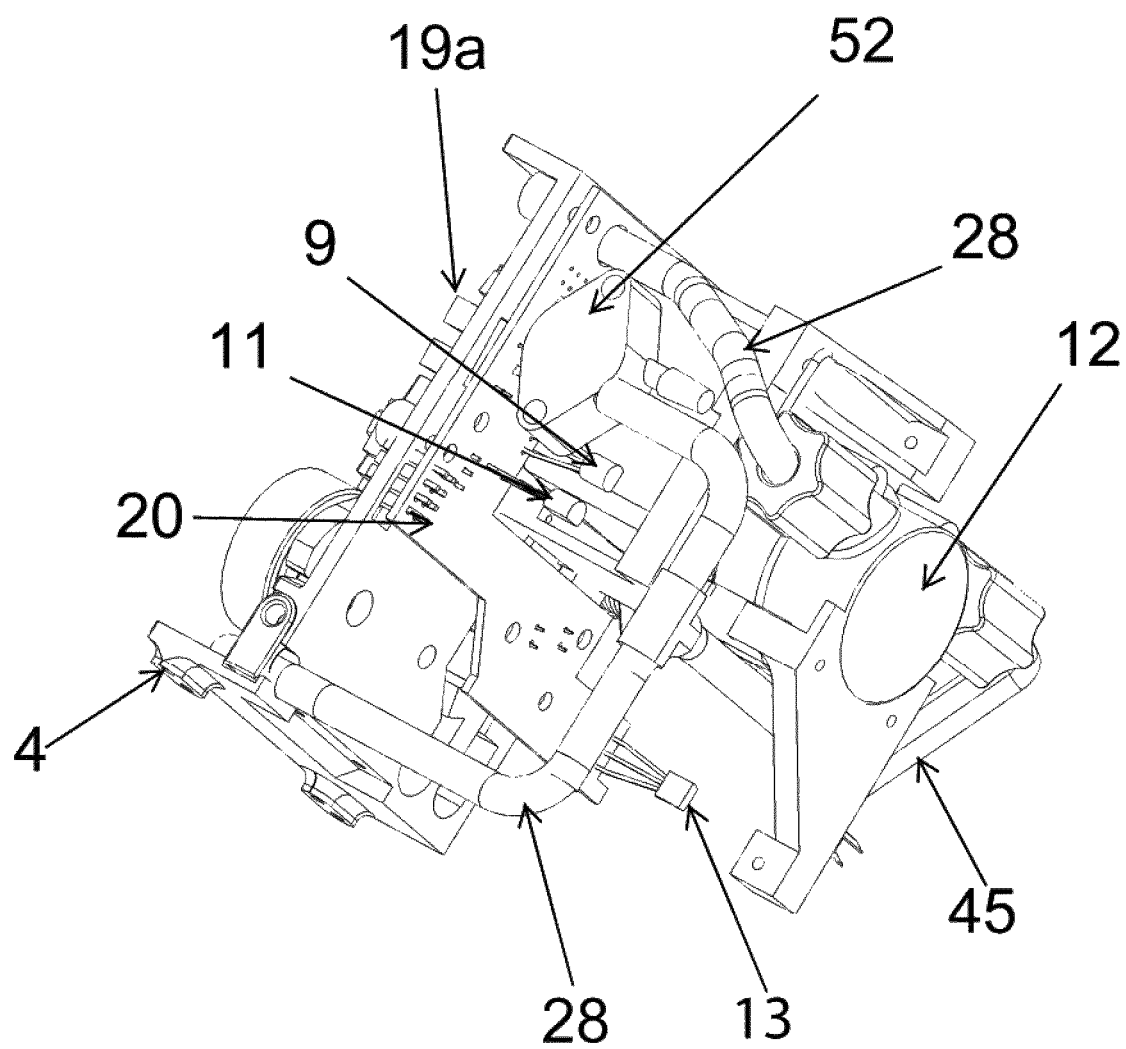

(58) Field of Classification Search
CPC .......... A01M 7/0089; B05B 3/02; B05B 1/22; B05B 3/105
See application file for complete search history.

(56) References Cited

U.S. PATENT DOCUMENTS

| | | |
|---|---|---|
| 9,486,820 B2* | 11/2016 | Bak .......................... B05B 3/02 |
| 9,832,925 B2* | 12/2017 | Leeb ..................... A01G 25/16 |
| 10,219,449 B2* | 3/2019 | Redden .................. A01G 22/00 |
| 2002/0100815 A1 | 8/2002 | Doebler et al. |
| 2014/0306030 A1 | 10/2014 | Omiatek et al. |

FOREIGN PATENT DOCUMENTS

| | | |
|---|---|---|
| JP | 2012223706 A | 11/2012 |
| WO | 2016192024 A1 | 12/2016 |

OTHER PUBLICATIONS

Written Opinion dated Oct. 13, 2017 re: Application No. PCT/EP2017/066508, pp. 1-3, citing: US 2002/100815 A1, CN 102 083 352 A and WO 2016/192024 A1.

* cited by examiner

ROTATING ATOMIZER DEVICE FOR APPLICATION IN APPARATUS FOR LAND SPRAYING

TECHNICAL FIELD

The present disclosure refers to a rotating atomizer device, of low volume, for its application in apparatus for land spraying of liquid and/or solid diluted and/or emulsified phytosanitary products for agriculture.

BACKGROUND

Even though there are many types of phytosanitary sprayers, going from aerial and/or land sprayers, with different means of propulsion that reach partial purposes such as controlling the direction of the drops, the amount of the insecticide vested in the area to be applied (with the airflows generators), at present there exists no device for a land sprayer that achieves the efficient application of the agro-chemical or phytosanitary.

In the field of the agriculture, there are different types of problems to be solved regarding the specific characteristics of the fumigation activity, including the inefficiency of weed and insect control through the application of phytosanitary chemical products by hydraulic pickaxes, ecological problems, consequences in people's health, excess of phytosanitary product to reach a good and efficient control, excessive water consumption, excessive cost in replenishment of machines, product waste that falls down on the ground and the pollution this causes, drift of the phytosanitary product, pollution of non-desired places (populations, fields, boundaries, rural schools and other places with danger to the population).

In the embodiment proposed in the present disclosure, we disclose a rotating atomizer device for drop generation capable of maintaining the drops size constant to deposit it directly in the target plant population to be controlled, as it minimizes the contamination of water systems, allows the control of the drift towards pen-urban areas, allows an efficient control with a lesser quantity of chemical product, minimizes the consumption of water as it applies the product with greater concentration, significantly increases the active cycle of the spraying machine and achieves an application of the agrochemicals with controlled drop sizes and amount per square centimeter of surface to be sprinkled.

During the XX century and insofar this XXI century, the world population shows a fourfold increase, passing from 1650 million to 7500 million inhabitants. This has only been possible with the global food production accompaniment that has been mainly boosted due to the extension of agricultural frontiers and the improvement of the crop protection systems.

This increase of food production has been carried out despite the action of the different pests that have accompany agriculture since its beginnings and in order to reach it the contribution of the phytosanitary chemical products has been essential.

The technology of current application is not so different from the one used since the beginning of the XX century. However, the mechanical process used to divide the chemical product in liquid state into drops that must be deposited over the plant population target of the sanitary treatment is still the same. The breakthrough technology of the liquid mass compacts into drops when pressure passing through an opening still offers the same usual adverse characteristics: a) deficient control of drop size; b) high heterogeneity of drop size. These deficiencies are the main reason of inefficient applications.

When spraying the plant population target of the sanitary treatment, part of the drops, the bigger ones, shall fall on the ground as they are not adhered to the plant leaves, this process of transference of phytosanitary chemical products to the ground, also called endo-drift, is transformed into product waste and in a significant environmental impact. This process of endo-drift may be deepen when applying the product over the crops with low foliage development as well as in crops with an important foliage development to which a very high dose of phytosanitary product is applied with the intention of reaching the proper amount of drops in the bottom part of the plant. Richard Courshee in Some Aspects of the Application of Insecticides, Annual Review of Entomology, Vol. 5: 327-352 (Volume publication date January 1960), reports such extreme cases that only the 20% of the applied chemical product remains in the plant, depositing the 80% on the ground.

Extremely small drops, in general of 100 microns (um) of surface to be sprinkled, depending on the conditions both of application, for example the distance to be covered from the element generating the drop up to the leaves of the plants target of the sanitary treatment, and on climatic conditions such as temperature, ambient humidity and wind speed, shall also be lost, either by evaporation or pneumatic transport outside the area in which the plant population to be treated is placed, affecting the neighbor non-target plant populations, damaging plant and animal organisms external to the phytosanitary process that is taking place.

As mentioned above, it has been proved that drops of a size smaller than 100 um of surface to be sprinkled have a high probability of being dragged by wind or being evaporated before reaching the target, which depends on the discharge height and the climatic conditions (wind speed, relative humidity and temperature). Both situations, dragging and/or evaporation, are contemplated within the phenomenon called exo-drift (Planas de Marti 1992; Doble et al. 1985; Miller and Hadfield 1989). This transport process generates serious consequences: decreases in the crop yield; repetition of treatments; induction to resistance on the part of the organisms to be controlled; damages to sensitive crops; direct damages to people and animals due to drifting exposition and indirect damages due to the consumption of contaminated food; rejection of products in the markets due to the presence of waste; delimitation of exclusion areas based on high urban pressure; lawsuits; etcetera. (Matthews 1985; Gil Moya 1993, Thronhill et al. 1995, 1996; Marrs et al. 1993).

According to Msc. Eng. Agr. Gerardo Masia of the Rural Engineering Institute (INTA Casterlar) in his lecture of the First National Seminar of Technologies for the Application of Phytosanitary (in Las Parejas, Santa Fe; Aug. 9 to 11, 2011). "In general terms, the effectiveness of the applications is about 40%, that is to say, every 100 drops that leave the application equipment only 40 are deposited in the target to be controlled. In another words, considering a tank of 4000 liters of capacity, 2400 liters do not reach the target, where they are deposited: a) evaporation; b) ground; c) neighbor crops; d) human beings".

At present, the application of phytosanitary products made with land machines, both self-propelled and dragging machines, is made with hydraulic pickaxes. Although this type of application is technically correct, the limitations of this technology in the generation of drops of uniform size prevent the minimization of non-desired phenomena both of exo-drift and of endo-drift. This way of drop generation, by making that a compact liquid passes through an opening at a sufficiently high pressure so that when crushing with the atmospheric air, transforms the above-mentioned compact liquid into a set of drops of different size. The universe of drops generated through this system is formed by a dimensional spectrum of a great diversity. The size of the generated drops includes a spectrum of 30 um the smaller to 1000 um the bigger.

In Lefebvre, A. H. Atomization and Sprays, Combustion: an International Series, Taylor & Francis, USA 1989 **The important properties of the liquid in the atomization process are the surface tension, the viscosity and the density. Basically, the atomization is produced as a result of the competence between the stabilization influences of the surface tension and the viscosity and the destabilizing actions of the different internal and external forces.

Regulation ASAE S-572 of Kirk, USDA characterizes the universe of drops according to their diameter as follows: drop smaller than 182 um: very fine; drop between 183 um and 280 um; fine; between 282 and 429; medium; between 430 and 531: thick; between 532 and 655: very thick; bigger than 655 um: extremely thick.

From the point of view of the efficiency of the sanitization process it should be achieved that an amount of drops of a specific and homogeneous size is deposited over the target. Even though the amount of drops per cm2 and their size may vary according to the chemical product used, it is known that the smaller drops of the generated spectrum will not reach the target because of the phenomenon called exo-drift and the bigger drops will neither do it because of the phenomenon called endo-drift.

In this manner, the proper drop size for a correct application is between 170 um and 270 um of diameter since a good penetration in the plant population target of the treatment can be obtained, minimizing the endo-drift and exo-drift.

The breakthrough mechanisms by pressure in the opening (system called by hydraulic pickaxes), apart from the variations in the drops size that is possible to achieve through changes in the pressure and diameter of the openings, produces inherently a great dispersion in the generated drop sizes contravening the main purpose of the process that is to achieve drops of an homogeneous size. One of the ways of valuing this phenomenon (of uniformity of drop size) is the dispersion factor. The dispersion factor (DF) is a calculation between the medium volumetric diameter and the medium nominal diameter (relation MVD/MND).

Regarding this field, several solutions have been proposed to the different problems which main purpose has been to solve the application of insecticides (phytosanitary) in the fields under secure and sanitary conditions, both for themselves and for the people and environment. Even though they could not encompass all these matters at the same time.

It is worth mentioning that there are different solutions to above-mentioned problems, such as for example the patent AR 090373 (A1) owned by BAZAN REMO ADRIAN, that describes a rotating atomizer with regulator of the drop size in real time through an automatic electronic device. It claims a rotating atomizing device with control of drop size exclusively for aerial spraying, wherein the power supply that propels the rotor in charge of the liquid atomization, include a variable pitch propeller activated by the speed to which the plane is moved (more than 250 km/h).

As a difference with the above mentioned antecedent, the disclosure herein disclosed includes a rotating atomizer device for the generation of drops of low volume for the use in dragging or self-propelled machines exclusive for the land spraying, in which the power supply that propels the rotor in charge of the liquid spraying, is a variable speed electric engine (of the BLDC type). It is unfeasible that said propellers in charge of the rotation of the rotor, proposed by the antecedent, can rotate faced to the wind concerning the advancement of a land pulverization at 16 km/h.

In this manner, the antecedent of the control of the drop size shall be produced varying the speed of the rotor that at the same time shall modify the incidence angle of the blades of the propeller. Once the blades of the propeller are placed in the correct position, the engine stops until it is necessary to make a new correction. Furthermore, said system has been designed for rotating hamper, not for rotating disc as is proposed in the present disclosure; the discs are used for small flows (in the order of 2 lt/minute maximum), instead the hampers that are used in planes are for much higher flows in lts/minute considering that a land machine sprays 50 ha/hr and a plane 400 hs/hr. It is not possible to generate uniform drops with rotating hampers for flows below 2 lts/minutes (h).

At the same time, in the antecedent no type of flow control is mentioned.

In particular, said antecedent differs from the disclosure herein disclosed in terms of: 1) MACHINE IN WHICH IT IS INSTALLED: It refers specifically to a mechanism for the generation of drops for use in planes that cannot be realised in land machines and vice versa, the disclosure herein disclosed refers to a mechanism that is only applicable for land spraying and is not suitable for plane use; 2) SPECIFIC PURPOSE: it refers to a measurement system of RPM of the propeller and a motorized mechanical system to modify the crossing of the blades of the propeller, making through a software an evaluation of the deviation of the programmed speed and modifying if necessary the angular position of the blades to restore the programmed rpm. In case of the purpose of the present disclosure, it is a generator of low volume drops, regulating the rotation speed of a rotating atomizer disc propelled by a low power electric engine of low voltage and direct current without brushes, that in no way could spray the amount of liquid that the perforated double cage atomizer used in the planes for aerial spraying atomizes; 3) TYPE OF ATOMIZER: it is coupled over a rotating atomizer of perforated double hamper; instead, the present disclosure refers to a plate rotating atomizer; 4) ENERGY NECESSARY TO "BREAK" A COMPACT LIQUID INTO PARTICLES (DROPS): the energy is provided by propellers mounted over the same axis of the set of atomizing hampers. It is the high speed of the vehicle over which the devices for the generation of drops are coupled that allows that the mechanism rotates at the necessary speed. Instead, in the purpose of the present disclosure, the energy in charge of the rotation of the plate is provided by an electric micro engine of direct current without brushes (BLDC) and over the axis of said engine, the plate is coupled. It is an engine which individual power does not exceed 50 W and the aggregated power of all the micro engines does not exceed one (1) HP of mechanical power. In the case of the antecedent, the only information in real time that enters the software of control is the rpm of the propellers (and of the hampers). Based on this only information and on the supposition that all the physical parameters of the agrochemical and the flow remain constant, the correction of the angular positions of the blades of the propellers is carried out with the purpose of maintaining the programmed rotation speed.

In the antecedent document, it has been stated that when the rpm are maintained, the drop size can be controlled. However, said reasoning has not foreseen the circumstance that the variations of the other parameters (flow, surface tension, temperature, density and viscosity), also influence in the size of the drops, and consequently, as they were not incorporated, they are not including the correction of the effect that they produce in the drop to be sprayed.

The flow may vary accidentally or intentionally and upon the variation of the temperature of the product, its physical properties (density, surface tension and viscosity) also vary. When said parameters undergo variations, they shall affect the manner in which the drops are formed in a rotating atomizer; the way of correction of these deviation of physical parameters of the product shall be varying the rotation speed according to the equation of Tanasawa. In order to carry out said correction, the software shall permanently recalculate the rotation speed.

The antecedent only mentions the constant maintenance of the rpm in order to maintain the drop size constant, ignoring the effects of the changes in the instantaneous flow and of the temperature over the size of the generated drops.

The temperature of the chemical product to be atomized shall also affect the functioning of the mechanical flow regulators (they are partial obstruction devices of an opening through which the chemical product shall pass), if as a consequence of the increase of the temperature the physical characteristics of the chemical product vary, this will affect the flow (that the antecedent does not measure) and even if it is measured it does not mention that its disclosure has the capacity of operating over it to correct eventual deviations.

As a difference with the antecedent, the purpose of the present disclosure to comply with the purpose prescribed in by the agricultural specialist as regards the drop size and flow/hectare, it not only measures the instantaneous rotation speed (as is the case of the mentioned antecedent) but also measures the instantaneous temperature of the chemical product to be sprayed and its instantaneous flow, thereby, applying the equations of Tanasawa in real time it determines the rotation speed that will produce the programmed drop size for the programmed flow, with permanent corrections in order to really maintain the programmed drop size.

Pages 11/32 of the application of the antecedent document state that "the software interface enables monitoring from the cabin the desired size, which allows the adaptation to the climatic variations such as wind, humidity and temperature".

The difference is that the antecedent takes for certain the fact that at a determined speed of rotation a determined drop size shall be produced without considering if the physical characteristics of the chemical product to be sprayed vary (density, surface tension and viscosity) as a consequence of its own changes of temperature or by a voluntary or involuntary modification of the flow. When in fact, users of these phytosanitary products have experienced during these years that the drop size not only depends on the rotation speed but also depends on the flow and the physical characteristics of the chemical product to be sprayed.

On the other hand, the patent document BR PI 2006/0501703-3 A owned by Alberto Samaia Neto, describes a Spraying device with a rotating system applicable in agricultural implements. Said document refers to a phytosanitary use and is for boom, the disc is also cylindrical and upwards, as a difference with the purpose of the present disclosure that claims a tapered disc and downwards. The only specification that the engine has is that it must be of the "proper capacity". It mentions that the apparatus is intended to the production of drops of a size of between 300 and 400 microns of diameter, as a difference with the present rotating atomizer device that claims a range of drops between 170 up to 270 microns of diameter, the antecedent produces drops outside the spectrum claimed herein. Furthermore, a fixed upside down dry cavity and another face up dry cavity of a slightly bigger diameter are mentioned, the smaller within the bigger one, but without touching each other. The bigger one placed in the lower area is the one in charge of rotating and producing the drops, which shall cause a dispersion of the drops size much bigger than the one described with the actual plate in the present disclosure and consumption of increased power of the engine.

At the same time, the antecedent mentions that the coverage of each unit is between 2.1 m to 2.3 m, that is due to the fact that the drops between 300 and 400 microns have more kinetic energy and travel more radial distance before falling. In the purpose of the present disclosure the plates are evenly spaced at a distance between 1.00 m and 1.40 m, almost half and the drops are always below the 300 microns of diameter.

Furthermore, it mentions an hectare flow of 15 to 40 lts/ha, that in the present disclosure is below 15 ltd./ha.

It also mentions the possibility of an electric controller that allows the selection of the hectare flow (lts./ha) and the proper drop size, independently of the advancement speed of the vehicle. It does not mention the relation between the drop size and the rotation speed that is inversely proportional, that is, that at a higher speed of rotation the smaller the drops size.

Said antecedent does not mention the possibility of correction due to factors such as flow, viscosity, surface tension or density.

It does not mention the possibility of correction due to variations of the above mentioned variables in light of changes in temperature.

It does not mention the way in which the speed control of the engine shall be done nor if this control is individual or joint.

It does not mention the control of the flow through any device nor does it mention if the regulation of the flow is individual or joint, it only makes reference to the fact that the flow is increased by increment of the pressure of the pump that supplies the chemical product.

At the same time, patent CN 2014/203620824 (U) owned by WUXI XUELANG ENVIRONMENTAL TECHNOLOGY CO LTD, claims a Disc for special atomization for rotation sprayer. It refers to an atomizing disc such as the ones used in the dairy industry to spray milk in the equipment for manufacture of powdered milk. Apparently, the main advantage lies in the possibility of being disassembled, in that the parts that are deteriorated over time can be easily replaced.

It is not mentioned for agricultural applications nor does it mention the range of drop size, the flow or the possibility of controlling neither of them.

Furthermore, the patent document JP 2012/223706 (A) owned by YONEHARA TAKASHI, YONEHARA OSAMU and YONEHARA HIRO, referred to an atomizer and a rotating spray method. It refers to a disc rotating atomizer which main characteristic appears to be that it has a fan for the generation of an airflow that propels the drops formed by the disc. In the case of the present disclosure it does not generate airflows. Said antecedent does not specify an agricultural use.

Figure 5:
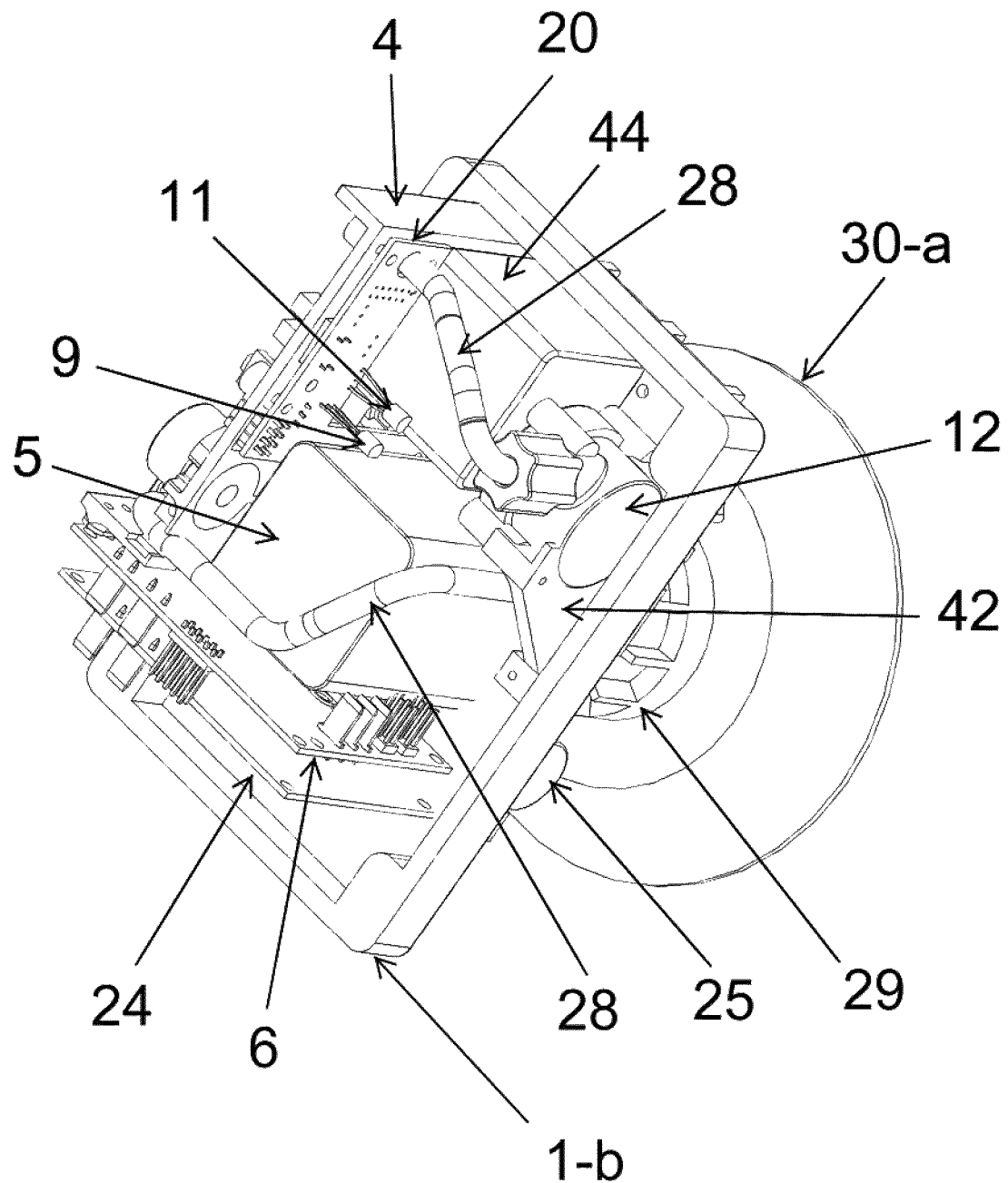
Figure 6:
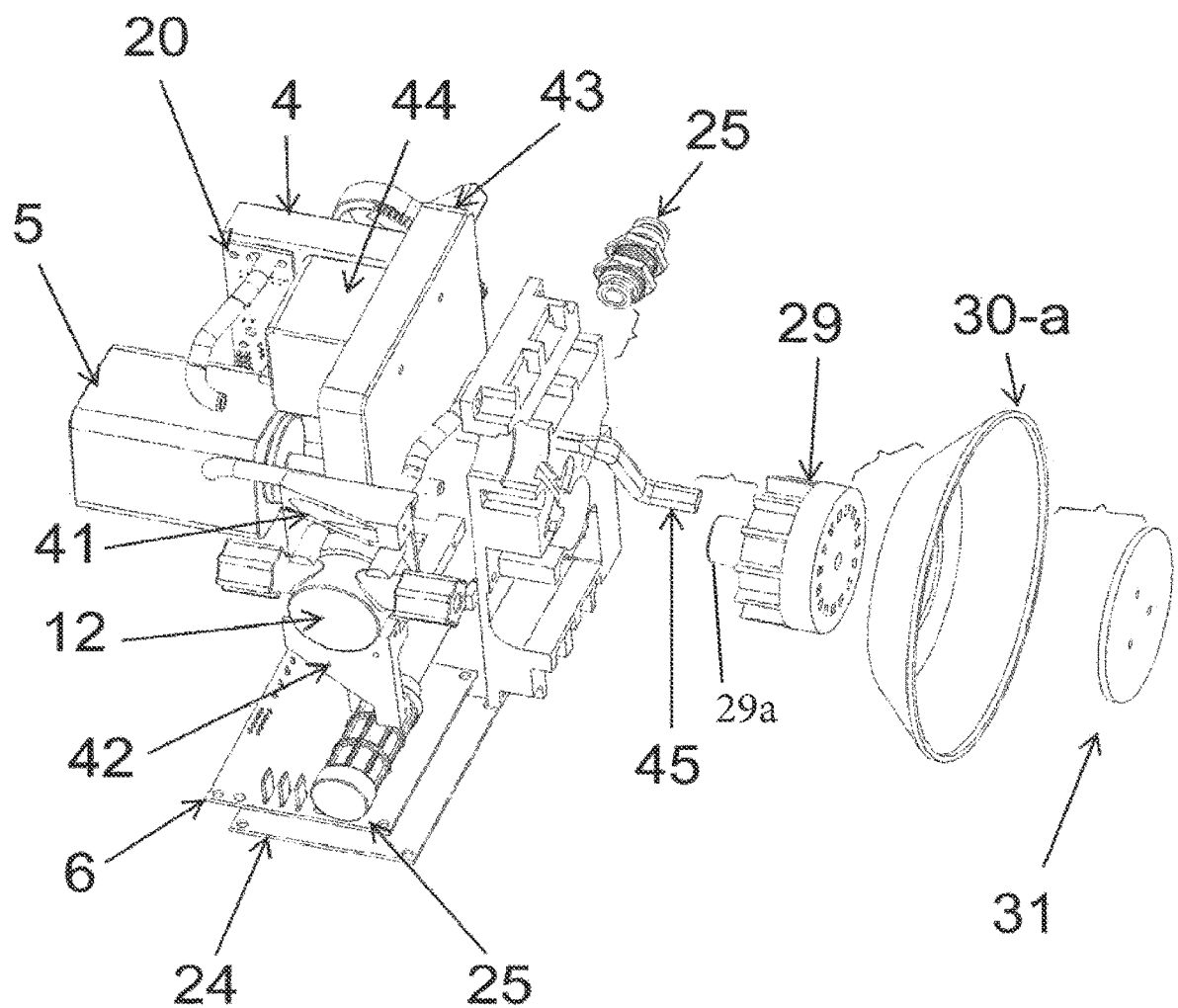
Figure 7:
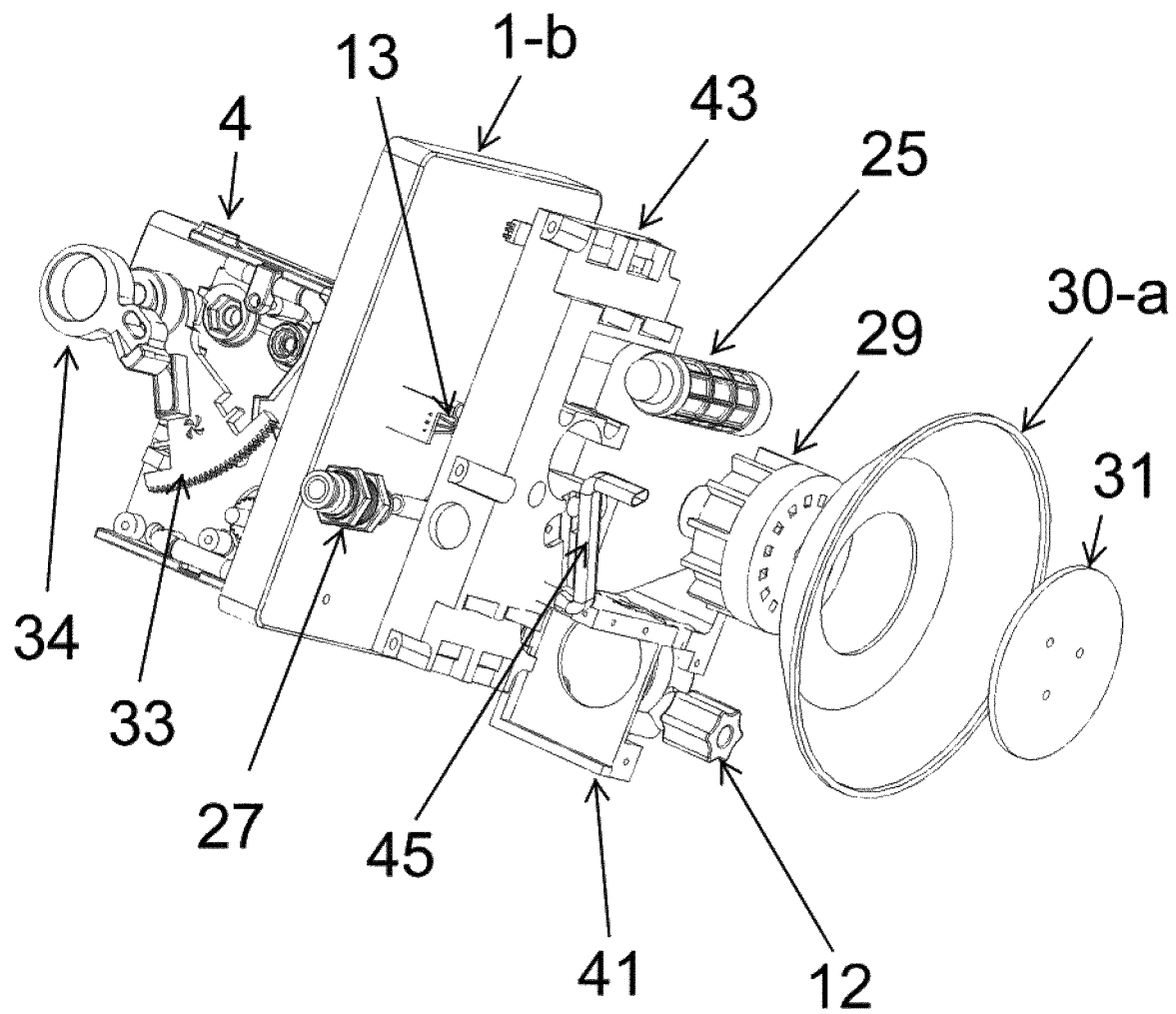
Figure 8:
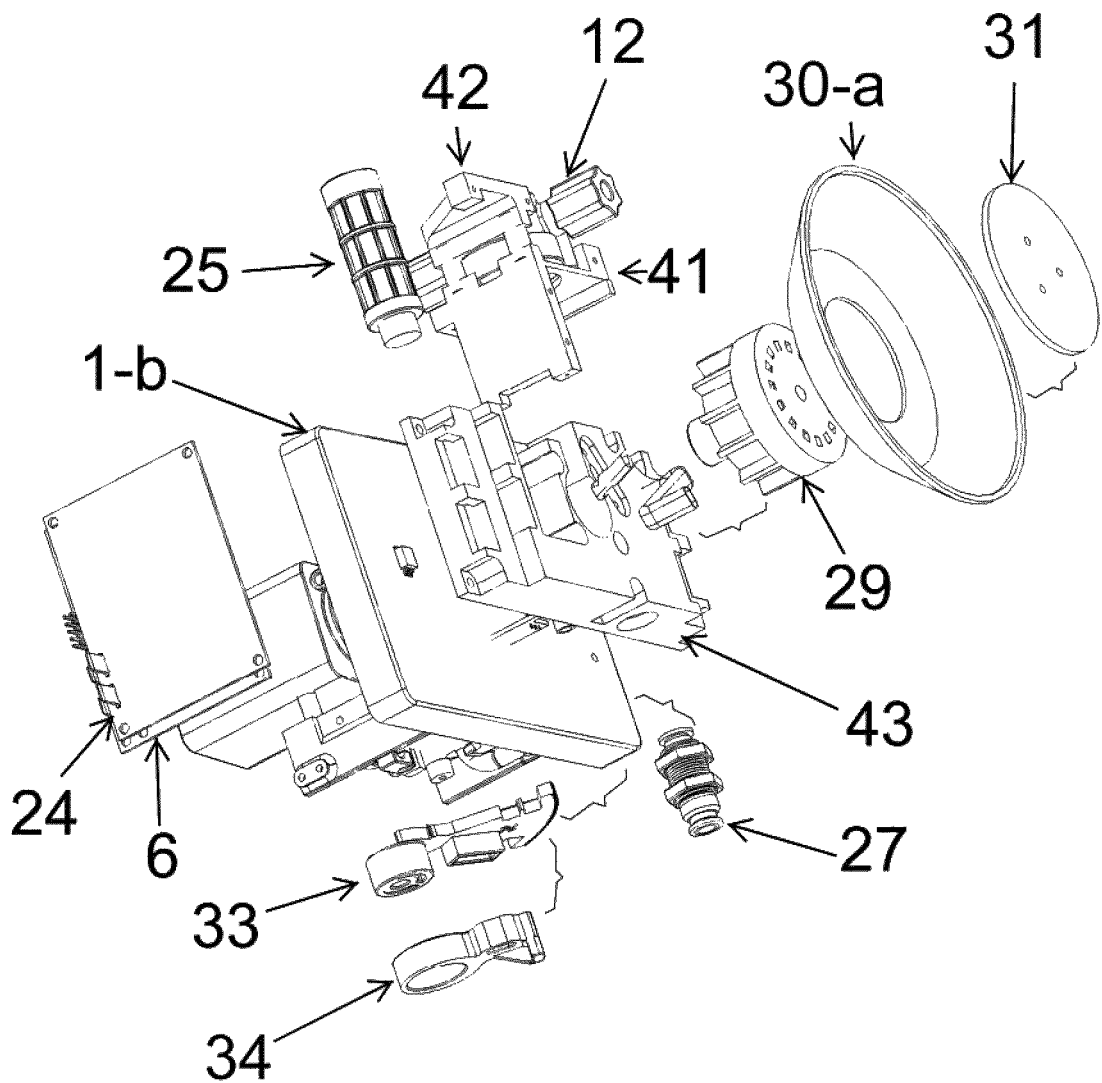
Figure 9:
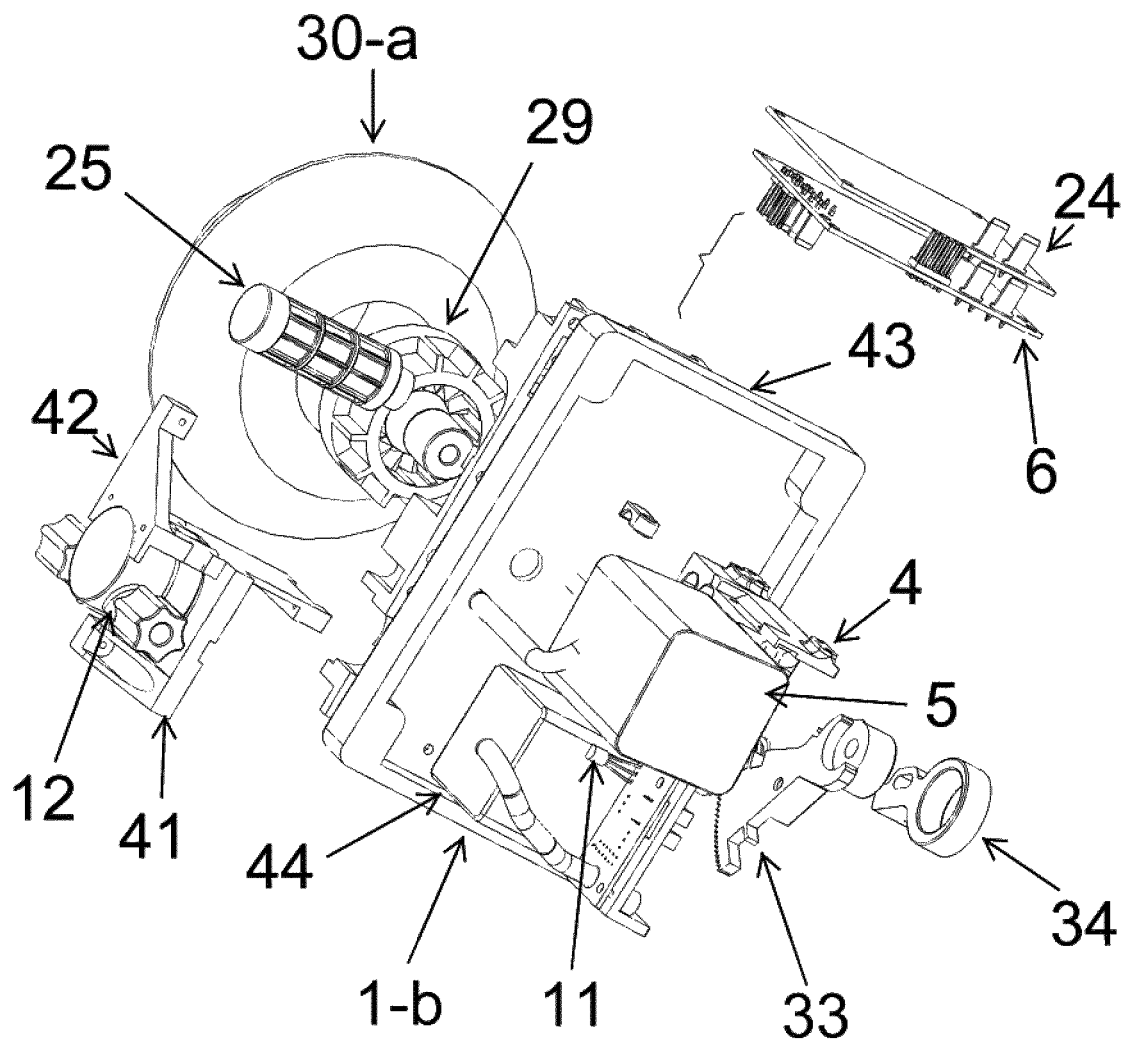
Figure 10:
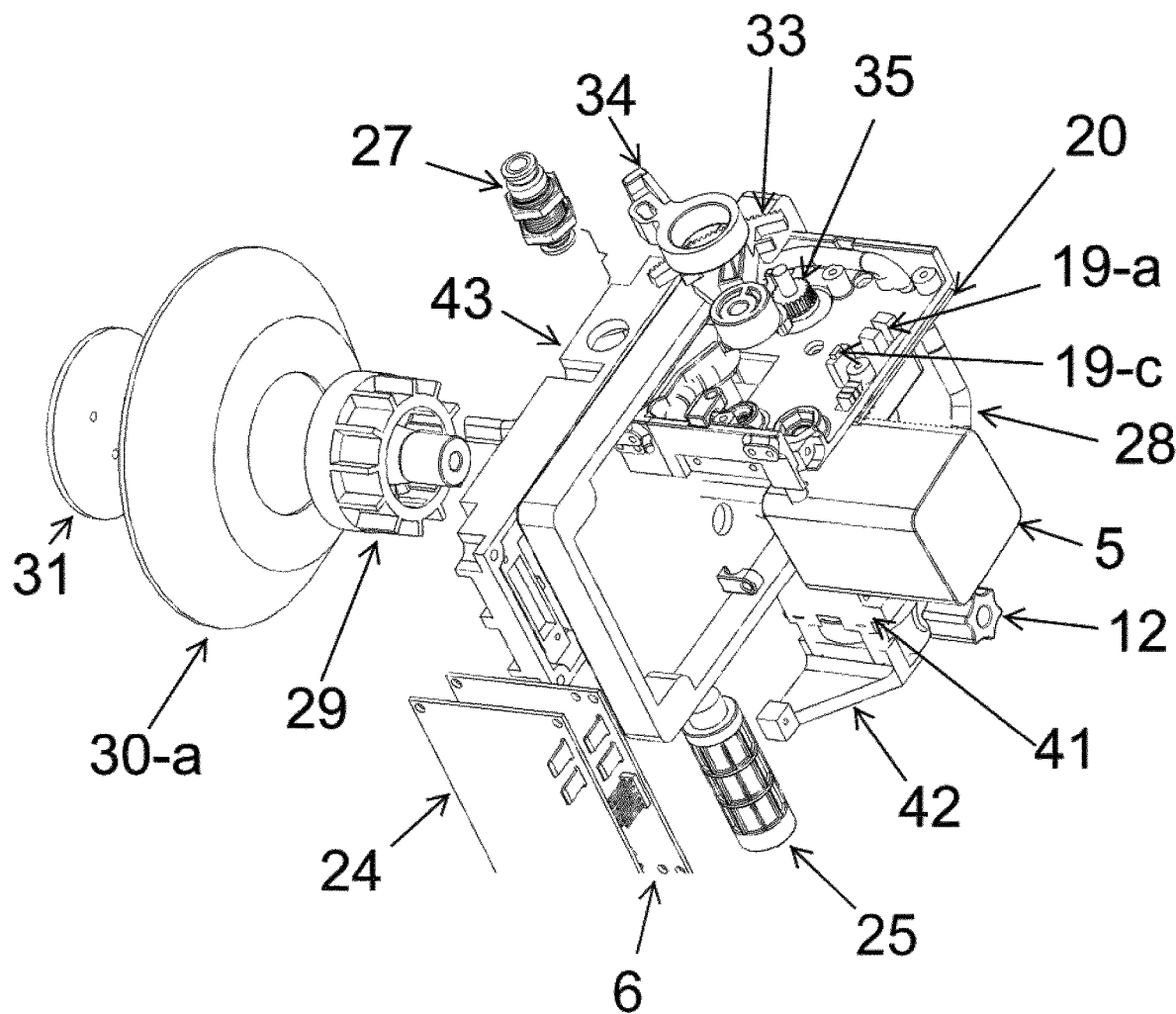
Figure 11:
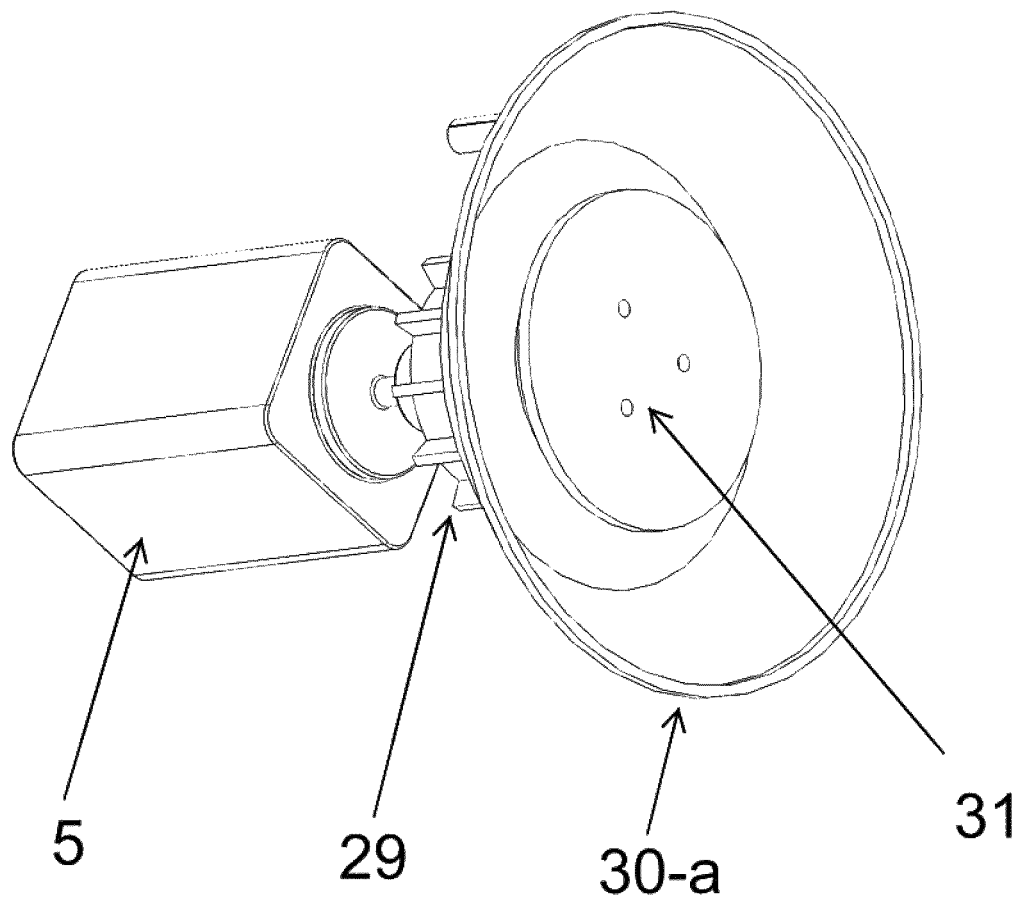
Figure 23:
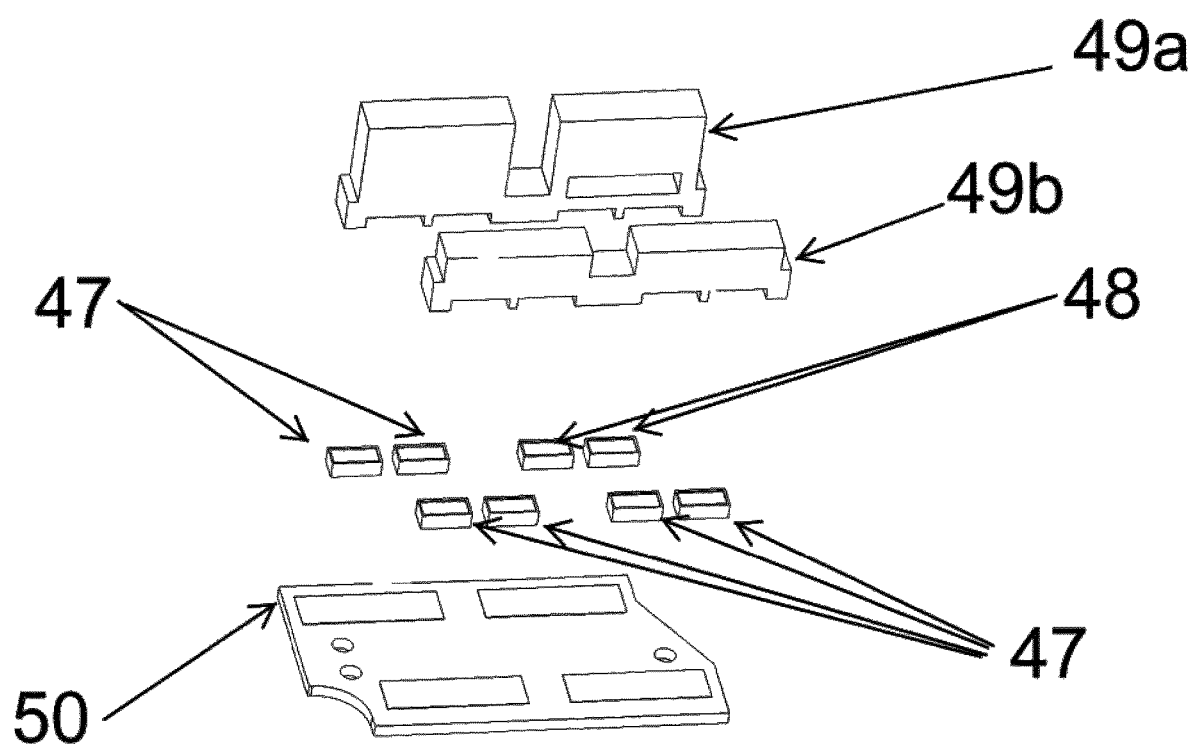
Figure 24:
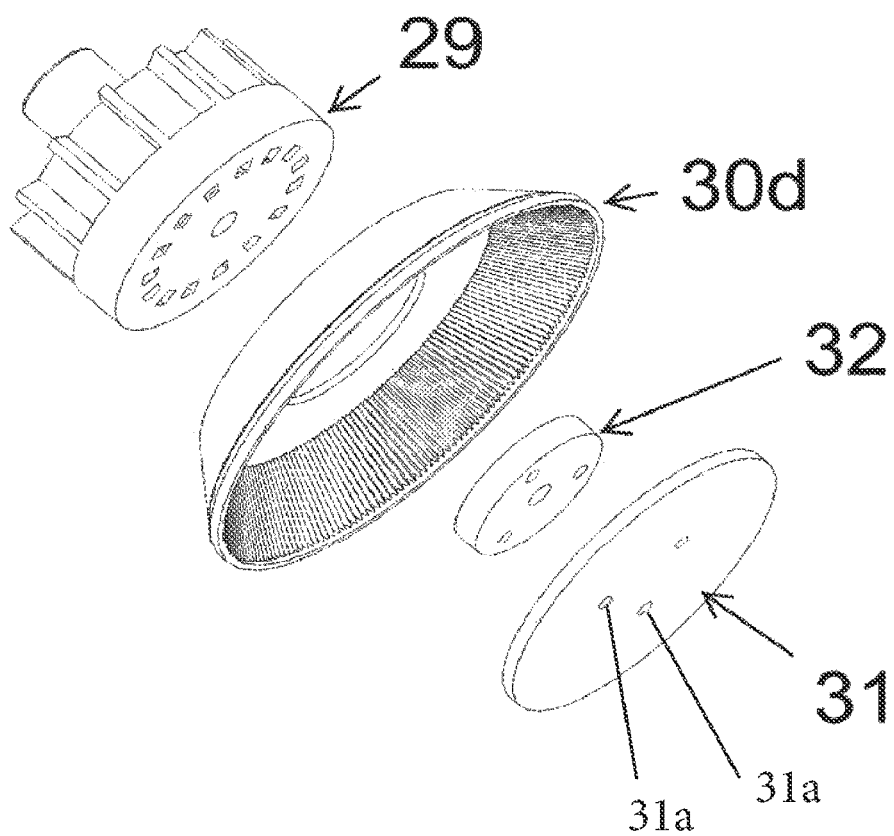
Figure 25:
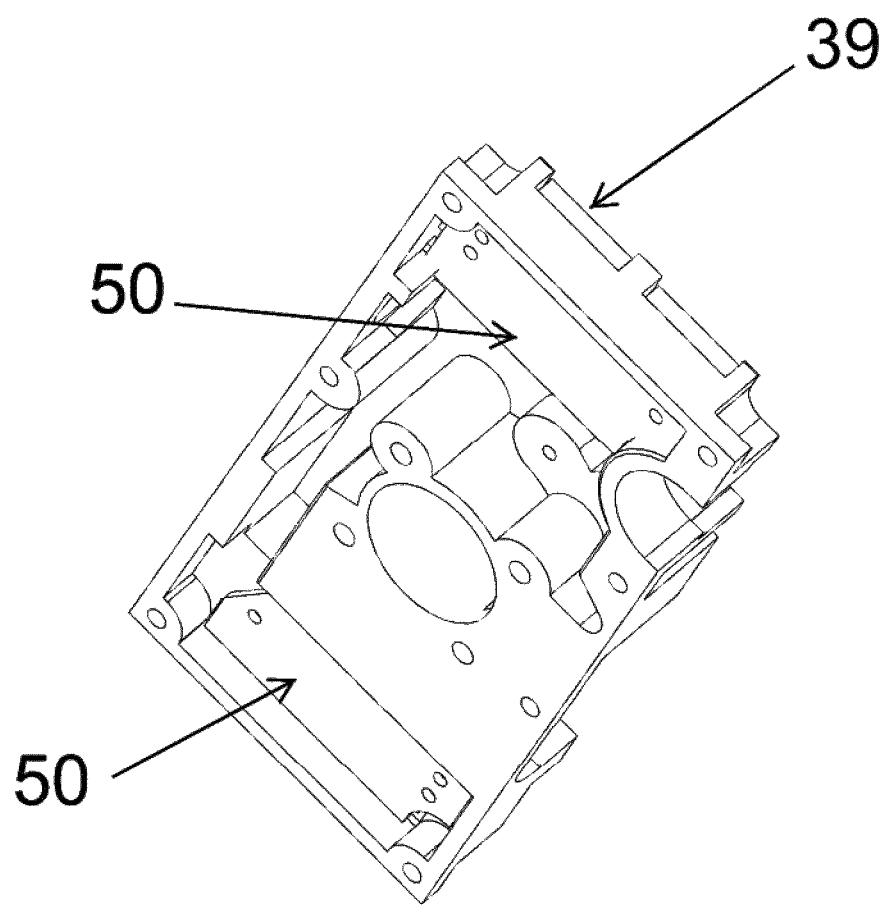
Figure 26:
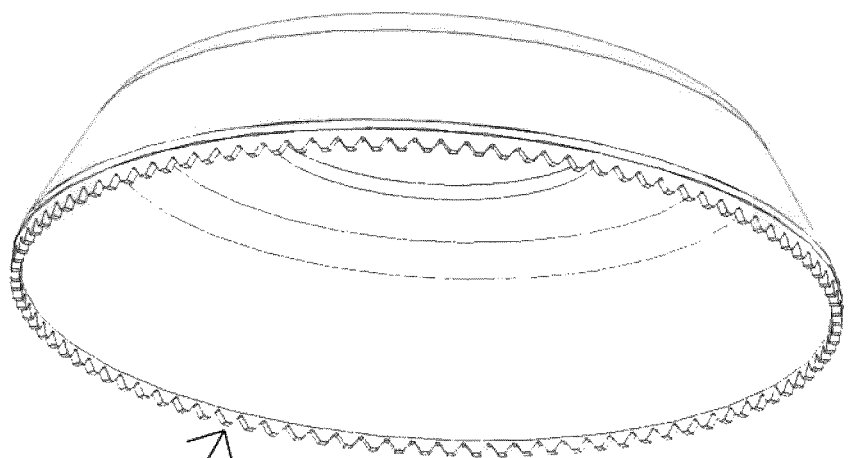
Figure 26:
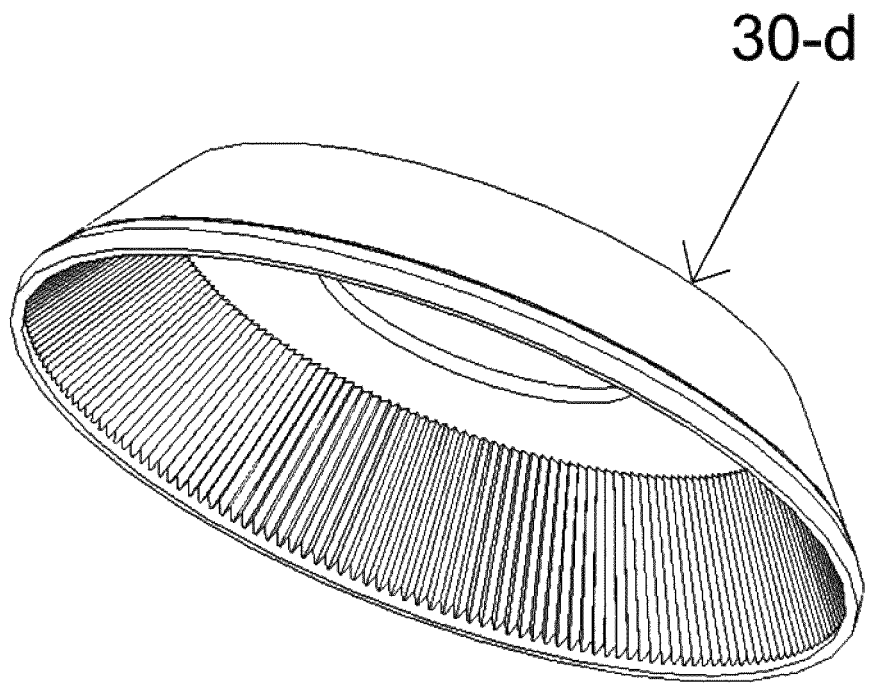
Figure 27:
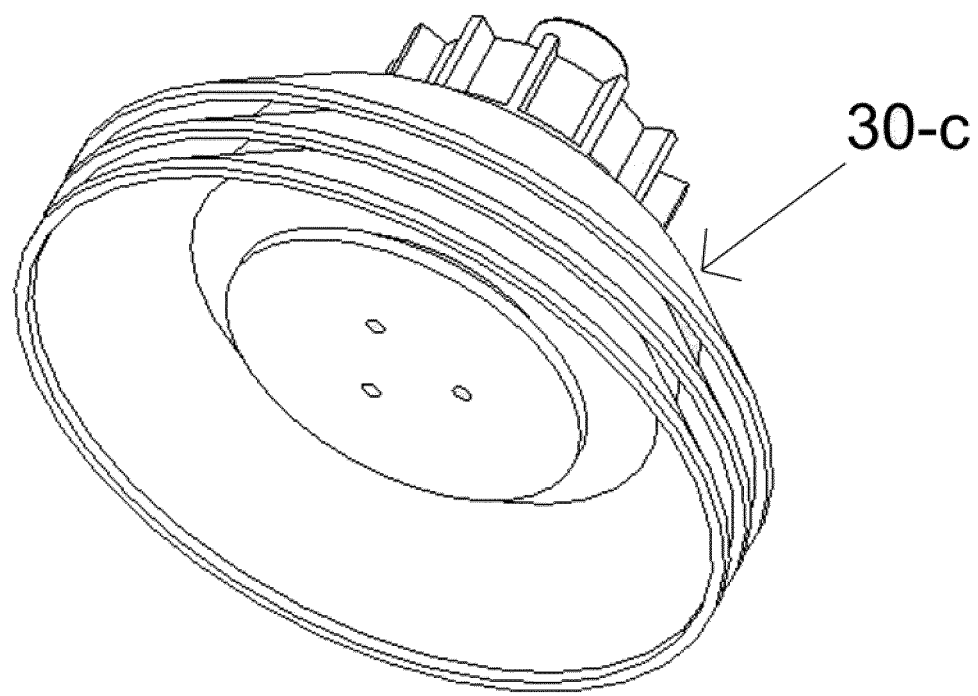

And patent US 2014/0306030 A1 owned by CLARKE MOSQUITO CONTROL PRODUCTS, INC., that claims a Sprayer of insecticide and mounting of spraying rotating head. It refers to the spraying of insecticides in areas with mosquito and specifies an objective drop size smaller than 50 microns of diameter, using one at a time. As a difference with the antecedent, the purpose of the present disclosure is to generate drops bigger than 150 microns of diameter.

BRIEF DESCRIPTION OF THE DRAWINGS

In order to facilitate comprehension and clarity the purpose of the present disclosure, it has been illustrated in several figures, in which it has been represented in one of the preferred embodiments, all by way of example, wherein:

FIG. 1 is a perspective view of the rotating atomizer device formed by a watertight cabinet that includes a main body 1-*a* and a cap 1-*b*; an electric watertight connector, formed by a base 2-*a* fixed to the cabinet and a mobile part fixed to the wiring 2-*b*.

FIG. 2 is a perspective view of the rotating atomizer device formed by the complete cabinet, the rotor 29 and the plate 30-*a* and closing disc 31.

FIG. 3 is a positional view in perspective of the rotating atomizer device formed by the complete cabinet, the rotor and the plate 30-*a* and its closing disc 31.

FIG. 4 is a view of the rotating atomizer device without the cabinet cap.

FIG. 5 shows a positional view in perspective of the rotating atomizer device without the cabinet cap.

FIG. 6 is an exploded view of FIG. 5.

FIG. 7 is a positional view of FIG. 6.

FIG. 8 is an exploded positional view of the rotating atomizer device and its components.

FIG. 9 is an exploded positional view of the rotating atomizer device and its components.

FIG. 10 is an exploded positional view of the rotating atomizer device and its components.

FIG. 11 is a detailed view of the engine BLDC 5, mass 29, disc 30-*a* and closing cap 31.

FIG. 12 is a detailed view of the engine BLDC 5, rotor 29, disc 30-*a* and closing cap 31, with the liquid outlet duct 45.

FIG. 13 is a positional view of FIG. 11.

FIG. 14 shows the engine BLDC 5, mass or rotor 29 and liquid outlet duct 45.

FIG. 15 is a positional view of the mass or rotor.

FIG. 16*a*) is a positional view of the mass or rotor.

FIG. 16*b*) is a positional view of the mass or rotor.

FIG. 17*a*) is a positional view of the mass or rotor.

FIG. 17*b*) is a sectional cut view of the mass or rotor.

FIG. 18*a*) is a view of the outside of the plate.

FIG. 18*b*) is a view of the inside of the plate.

FIG. 19 is a sectional cut view of the mass and disc and detailed view of the liquid outlet duct 45.

FIG. 20 is a detailed view of the flow regulator without cap.

FIG. 21 includes a detailed view of the frame of the flow regulator.

FIG. 22 includes a detailed view in the LEDs circuit.

FIG. 23 is an exploded view of FIG. 22.

FIG. 24 is an exploded view of the mass 29, plate 30-*d* and closing disc 31 and closing disc separator 32.

FIG. 25 is a back view in detail of the frame of the flow regulator.

FIG. 26*a*) is a view of the plate with serrated edge.

FIG. 26*b*) is a view of the plate with striped inner.

FIG. 27 is a view of the mass or rotor and set of three plates and closing disc.

FIG. 28 is a view of the complete rotating atomizer device and assembling in which the income and dispersion of the phytosanitary liquid can be observed.

FIG. 29 shows a functional diagram of the present disclosure.

FIG. 30 shows a functional diagram of the rotating atomizer device with flow measurement by opening plate and pressure measurement.

FIG. 31 shows a functional diagram of the rotating atomizer device with flow measurement by flowmeter.

FIG. 32 shows a graphic of the rotation position of the apparatus for spraying.

FIG. 33 shows a graphic of the change of course (deviation) of the spraying apparatus.

FIG. 34 illustrates the control panel.

DETAILED DESCRIPTION OF THE DRAWINGS

The present disclosure refers to a rotating atomizer device, of low volume, for its application in apparatus for land spraying of liquid and/or solid diluted and/or emulsified phytosanitary products for agriculture and its method for application.

The rotating atomizer device includes at least the parts that are detailed below: 1) A watertight cabinet of zamac aluminum type, plastic or other material that protects the content and allows its mechanical fixing to the boom, formed by a main body according to FIG. 1; 1-*a*) and a cap according to FIG. 1; 1-*b*); 2) a watertight electric connector that allows the connection of the rotating atomizer device to the power supply of 12 Vcc type (or 24 Vcc, according to the power supply voltage of the machine that transports the rotating atomizer devices) and to the data communication net, formed by a basis according to FIG. 1; 2-*a*) fixed to the cabinet and a mobile part fixed to the wiring according to FIG. 1; 2-*b*); a mass or rotor according to FIG. 1; 29) a support frame of the leds according to FIG. 1; 43) 3) a flow regulator according to FIG. 20; 4) a main frame 20 according to FIGS. 5 and 10 over which the other component pieces are fixed, in particular: a step motor (hereinafter STEP) according to FIG. 5; 44) a gear joint to its axis according to FIG. 10; 35), a cogwheel according to FIG. 10; 33) that when rotation in an axis engages with the teeth the above-mentioned gear, through an axis cylinder parallel to its rotation axis but displaced so as to imprint a lineal movement proportional to the rotated angle, that linked to this cylindrical protrusion of the cogwheel is the rod according to FIG. 7; 34) that guided by a slide to such effect that presses over the peristaltic hose according to FIG. 5; 28) in order to occlude it to a greater or lesser extent and a screw for zero flow regulation according to FIG. 20; 46); 5) A micro engine of direct current of the no-brush type (known as brushless or BLDC, hereinafter BLDC engines) according to FIG. 5; 5); 6) A platelet of speed control of the above-mentioned BLDC engine according to FIG. 5; 6): 7) A module for speed and position control of the STEP engine welded in the communication, processing and control platelet FIG. 5; 24); 8) A voltage sensor circuit and an integrated current circuit of power supply of the BLDC engine welded in the communication, processing and control platelet according to FIG. 9; 24) 9) A temperature sensor integrated circuit welded in the sensor platelet according to FIG. 5; 9) attached to the body of the BLDC engine; 10) A voltage sensor circuit and integrated current circuit of the power supply of the STEP engine welded in the communication, processing and control platelet according to FIG. 9; 24); 11) A temperature sensor integrated circuit welded in the sensor platelet according to FIG. 5; 20) attached to the body of the STEP engine; 12) a flowmeter according to FIG. 6; 12); 13) A magnetic sensor integrated circuit welded in the sensor platelet according to FIG. 8 that measures the rotation speed of the BLDC engine; 14) A temperature sensor integrated circuit attached to the final duct of liquid output according to FIG. 12; 14) prior to the rotor according to FIG. 6; 29) that measures temperature of the spray liquid; 15) A lighting system of the led type in charge of the night spraying with information of failures per color or per difference of bright or modulation of blinks according to FIG. 23; 47); 16) A humidity sensor integrated circuit welded in communication, processing and control platelet according to FIG. 9; 24) that measures humidity in the inside of the cabinet and detects eventual damage in its seal or the breakage of any of the inner components (peristaltic hose according to FIG. 4; 28), liquid connectors according to FIG. 7; 27) and flowmeter according to FIG. 6; 12); 17) A temperature sensor integrated circuit welded in the communication processing and control platelet according to FIG. 9; 24) for the temperature of the inner space of the cabinet; 18) a set of rotor or mass according to FIG. 6; 29), at least a plate according to FIG. 18, a closing disc according to FIG. 2; 31) coupled to it and to the BLDC engine axis; 19) At least two barrier optical sensors integrated circuits according to FIG. 20; 19-*a*), of the end of the route of the cogwheel according to FIG. 7; 33) of the flow regulators and at least one analogic magnetic sensor according to FIG. 20; 19-*c*) and its magnet 19 *b*) for the determination of the intermediate positions; 20) A sensor platelet, in which the sensors mentioned in points 9, 11, 13 and 19 are connected; 21) A magnetometer integrated circuit welded in the communication, processing and control platelet according to FIG. 5; 24); 22) An accelerometer integrated circuit welded in the communication, processing and control platelet according to FIG. 5; 24); 23) A gyroscope integrated circuit welded in the communication, processing and control platelet according to FIG. 5; 24); 24) A communication, processing and control platelet with microcontroller, memory, clock rtc with battery, keyboard, display, hardware drivers for communication protocols CAN, RS232, IIC, RS485, that includes the sensors mentioned in points 16, 17, 21, 22, 23 and the control module for the STEP engine mentioned in point 7; 25) A filter of air inlet according to FIG. 7; 25); 26) A heating resistor to avoid condensation of ambient humidity in the inside of the welded cabinet in the communication, processing and control platelet; 27) A connector for liquid inlet according to FIG. 7; 27); 28) A peristaltic hose according to FIG. 5; 28); 29) A mace (or rotor) according to FIGS. 16 and 17: 30) a plate from which different versions can be used according to FIGS. 18 and 26 and 27; 31) A closing disc according to FIG. 2; 31); 32) Closing disc separator according to FIG. 24; 32); 33) A cogwheel according to FIG. 7; 33) with a central body of displaced eccentric axis; 34) A cam or rod according to FIG. 7; 34); 35) A gear for the STEP engine according to FIG. 20; 35); 36) A led for indication of the power of the sensor platelet according to FIG. 20; 36) 37) A led for indication of the rotation of the BLDC engine welded in the sensor platelet according to FIG. 20; 37); 38) A led for indication of the opened position of the cogwheel welded in the sensor platelet according to FIG. 20; 38); 39) A led for indication of the closed position of the cogwheel welded in the sensor platelet according to FIG. 20; 39); 40) Flow regulator according to FIG. 20); 41) Base support of flowmeter according to FIG. 8; 41); 12); 42) Closing support of the flowmeter according to FIG. 8; 42); 12); 43) Support frame of the leds according to FIG. 21; 43), the liquid connector according to FIG. 7; 27) and the air filter according to FIG. 7; 25); 44) A STEP engine according to FIG. 5; 44); 45) A duct of liquid outlet according to FIG. 6; 45); 46) A zero flow adjustment according to FIG. 20; 46); 47) White lighting leds according to FIG. 22; 47); 48) Red indication leds according to FIG. 22; 48); 49) Diffuser lens according to FIG. 22; 49-*a*), Diffuser lens according to FIG. 22; 49-*b*); 50) Leds platelet according to FIG. 22; 50); 51) Fixation clamps of peristaltic hose according to FIG. 20; 51); 52) Pressure gauge welded in the sensor platelet according to FIG. 4; 52).

The flow regulator includes basically a duct of the silicon type (28) of the type of the ones used in the peristaltic pumps (in order to support of phytosanitary chemical products, it has been chosen to benefit from the physicochemical characteristics of the silicon hoses used in peristaltic pumps, suitable for any type of chemicals due to their simultaneous resistance to the attack of chemical products as well as their capacity to continuously support transversal comprehension and decompression cycles to the direction of travel of the fluid inside them). The liquid circuit is an only lace of silicon hose that starts from the income through a connector of wall passage type (27) until the area where it is possible to make an occlusion or release of the flow that transits inside the duct, until reaching to the outlet nozzle (45) that is composed of a metallic element that is capable of transmitting temperature of the liquid that is inside it to the attached temperature sensor (14).

The route includes in its way a palette flowmeter (12) to measure the flow. The STEP engine (44) produces the movement of the cogwheel (33) in one direction and the other through a gear (35) placed at the end of its axis.

The cogwheel (33) has two limits of barrier optic route that coincide with the extreme positions of its route in order to stop the STEP engine (44) and prevent eventual damages to the actuating mechanism. One of them (19 *a*) is placed in the upper part of the frame (20) and detects when the cogwheel (33) is completely separated moving the cam (34) away of the bed completely releasing the liquid flow. The other (19 *b*) is in the lower part of the frame, partially hidden behind the bed, and it detects when the cogwheel (33) is completely rotated in anticlockwise direction, pressing the cam (34) in the direction of the bed completely occluding the liquid flow.

The analogic hall sensor (19 *c*) placed in the upper part of the frame (20) next to the barrier optical sensor (19 *a*) mentioned in first place, generates a tension inversely proportional to the distance of the joint magnet (19 *d*) to the cogwheel (33), in such a way that the tension generated is minimum when the hose (28) is completely occluded and in maximum when the occlusion is null.

The flow regulator (FIG. 20) operates in such a way to maintain the flow obtained by the application of the equations that determine it based on the agronomic professional prescription and to the separation between the rotating atomizer device and to the vehicle speed that transports it (agricultural machine) measured by a GPS type device, to the variation of the vehicle course that transports it measured by the magnetometer (FIG. 5; 24) and accelerometer (FIG. 5; 24) and gyroscope (FIG. 5; 24), to the physical characteristics of the spray liquid that at the same time determine through the technical information of the chemical products that form the spray liquid and its proportions previously loaded in the database of the screen, the spray liquid temperature measured by the sensor (14) attached to the outlet tube and the temperature, ambient humidity and wind speed measured by the meteorological central.

It works as a method for reloading that measures the flow resulting through the flowmeter (12) of the current occlusion, in case the flow is smaller than the programmed one it activated the cogwheel through the STEP engine (44) pushing the cam away (43) from the bed decreasing the occlusion of the peristaltic hose (28) so as to increase the flow until it coincides with the programmed flow. Inversely, in case the measured flow is bigger than the programmed one, it acts approaching the cam (43) to the bed increasing the occlusion of the peristaltic hose (28) to decrease the flow until it coincides with the programmed flow. EI above-mentioned atomizer has a BLDC type engine (5), the electronic platelet of speed control (6), a rotor or mace (29) and at least a disc or plate (30 a, b,c,d), a separator (32) and the closing cap (31) according to FIGS. 11 and 24). The cap (31) includes a plurality of inserts 31a. the rotor (29) also includes a plurality of channels 29c radially distributed.

Figure 16:
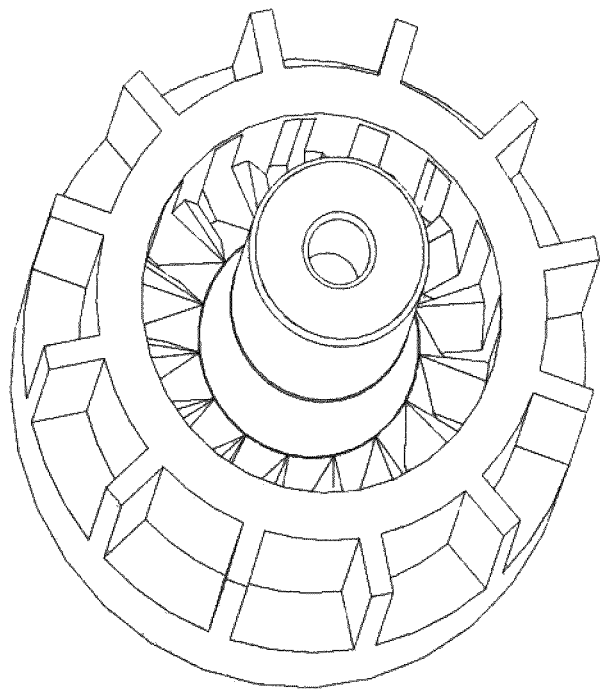
Figure 16:
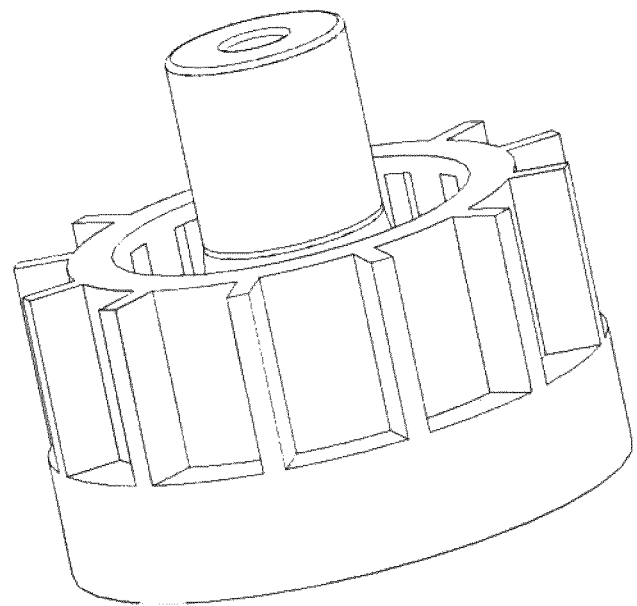
Figure 17:
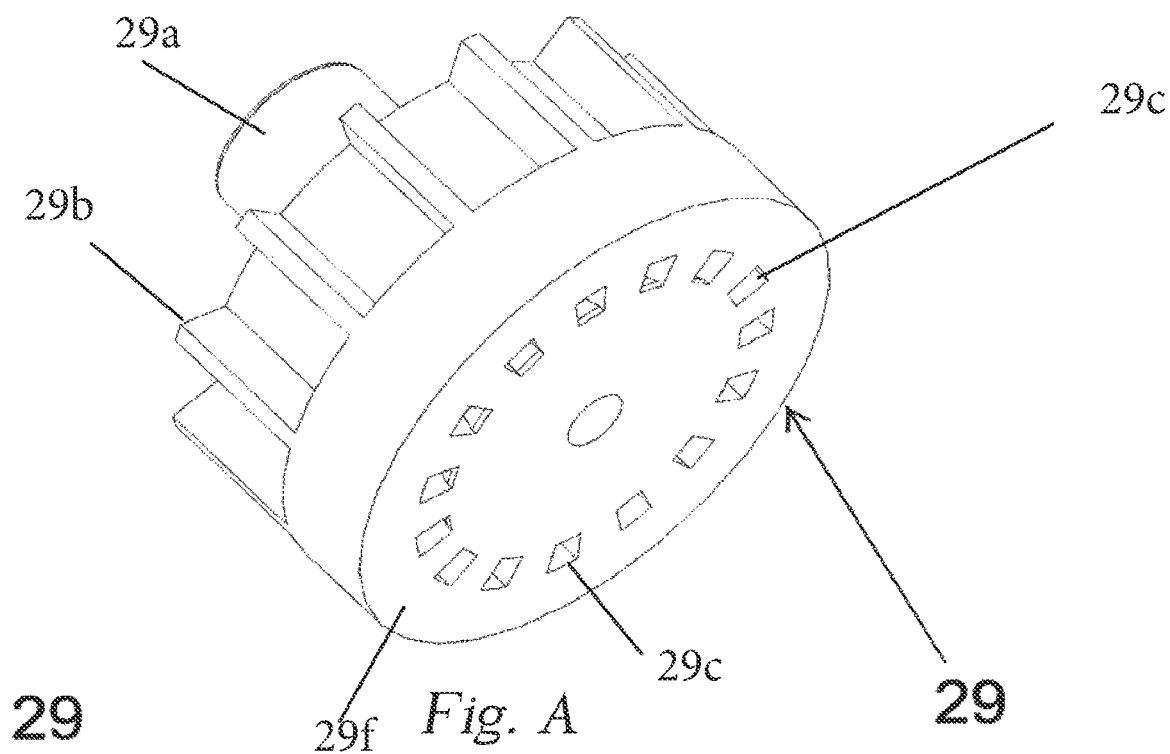
Figure 17:
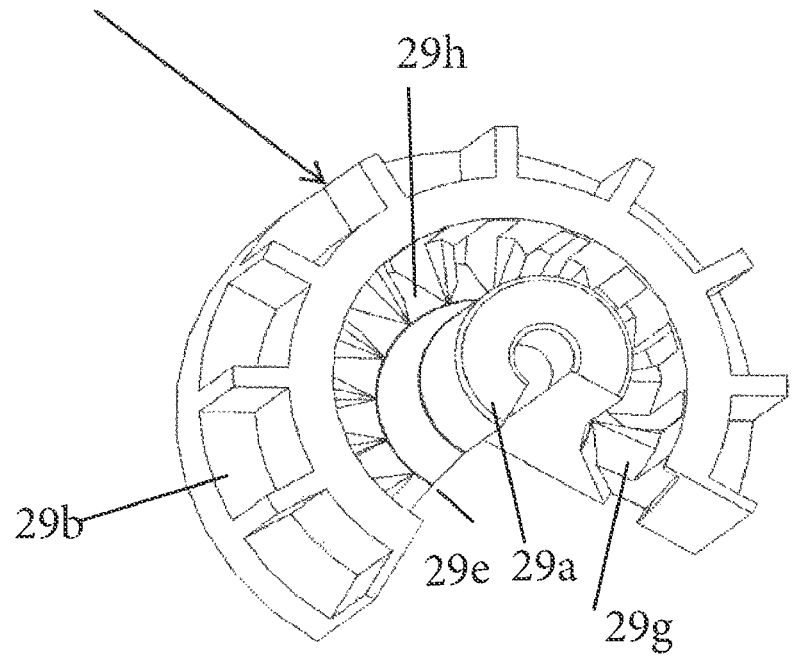
Figure 18:
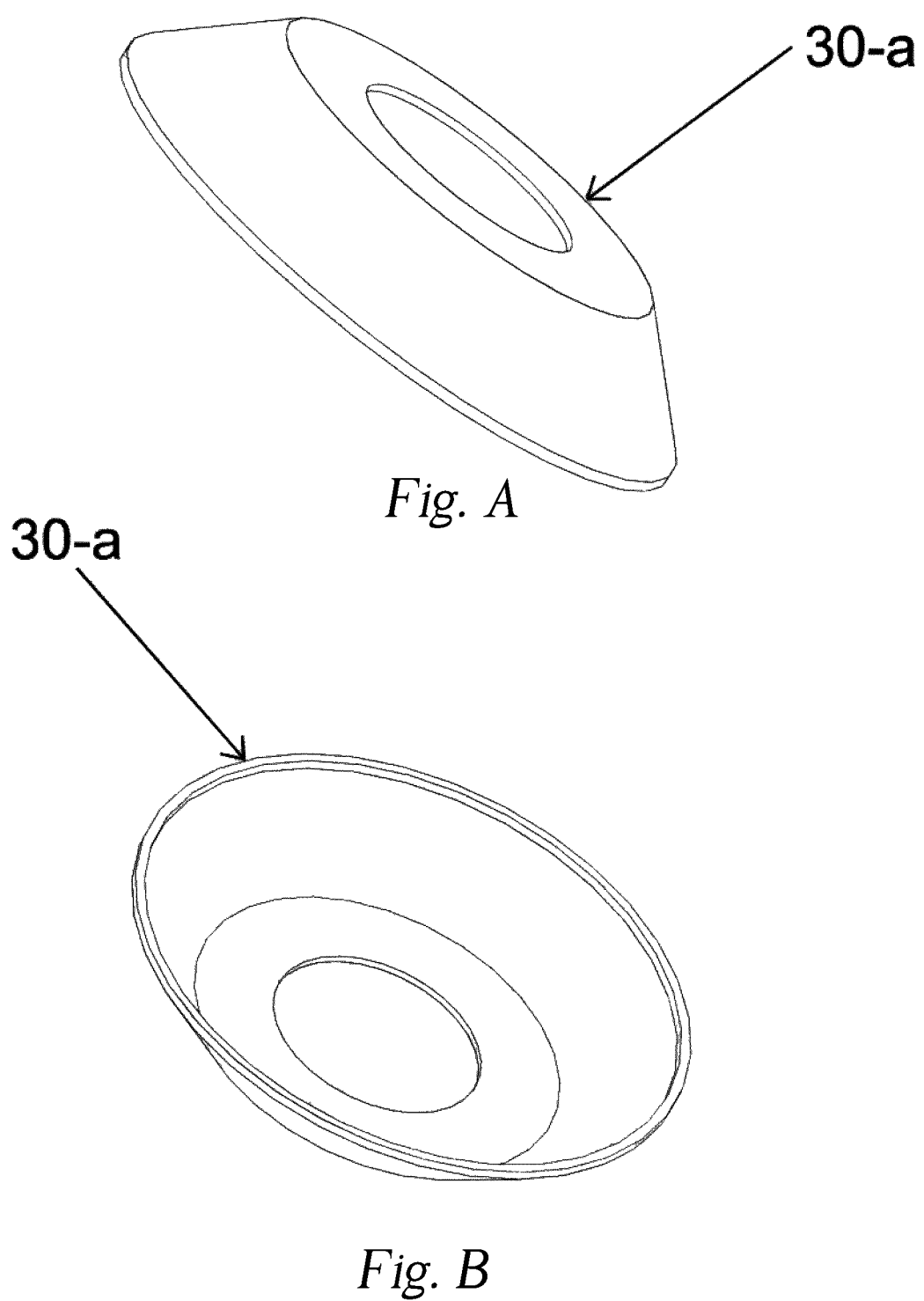
Figure 19:
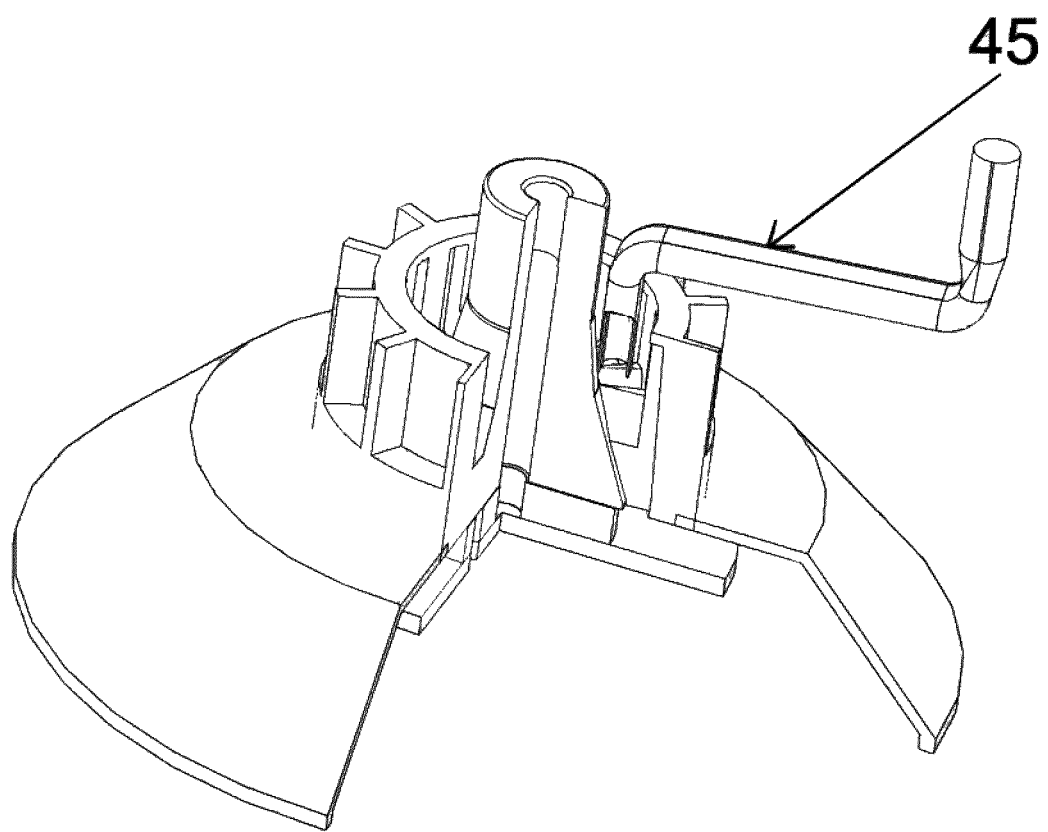
Figure 20:
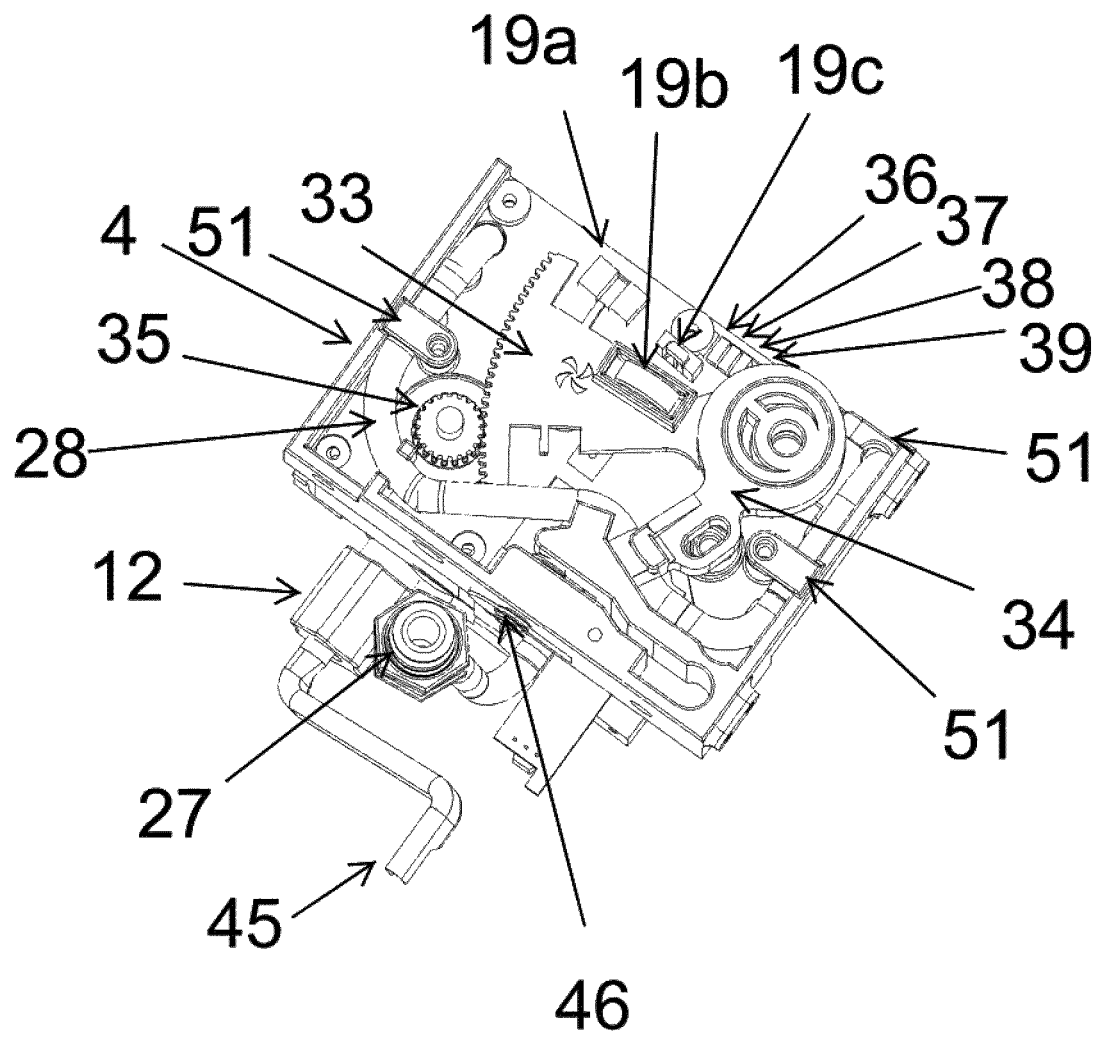
Figure 21:
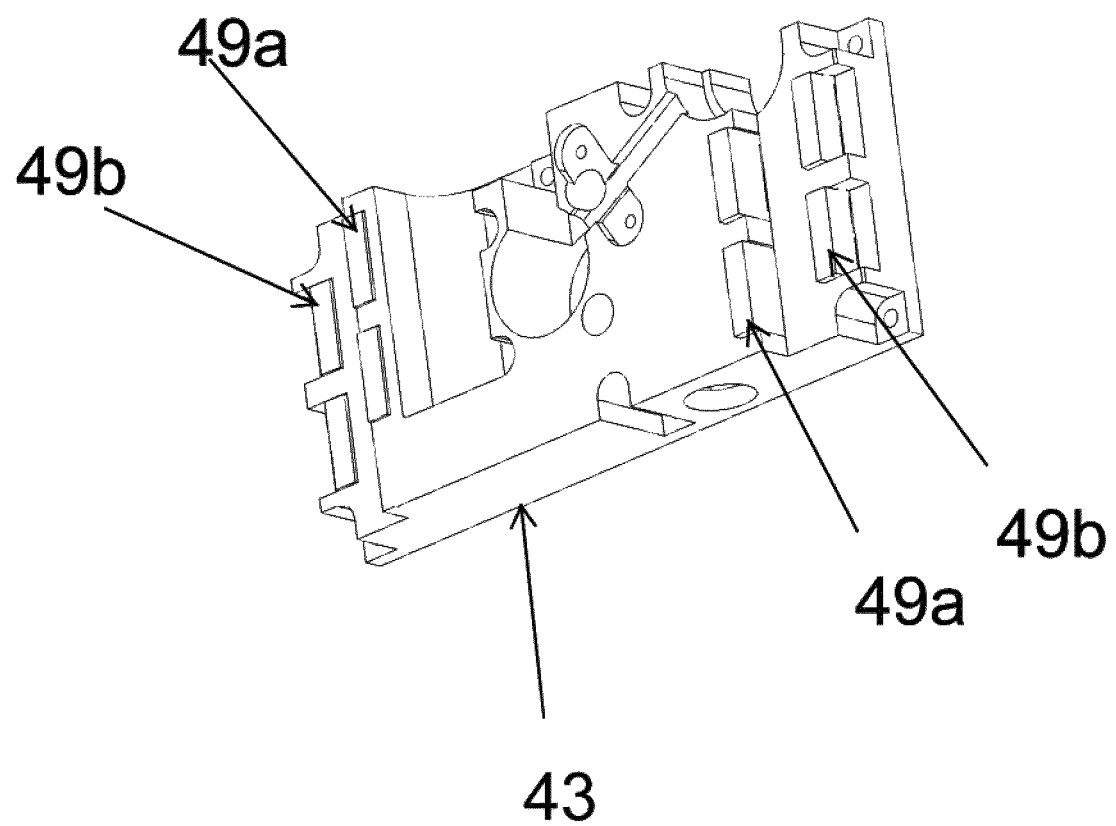
Figure 22:
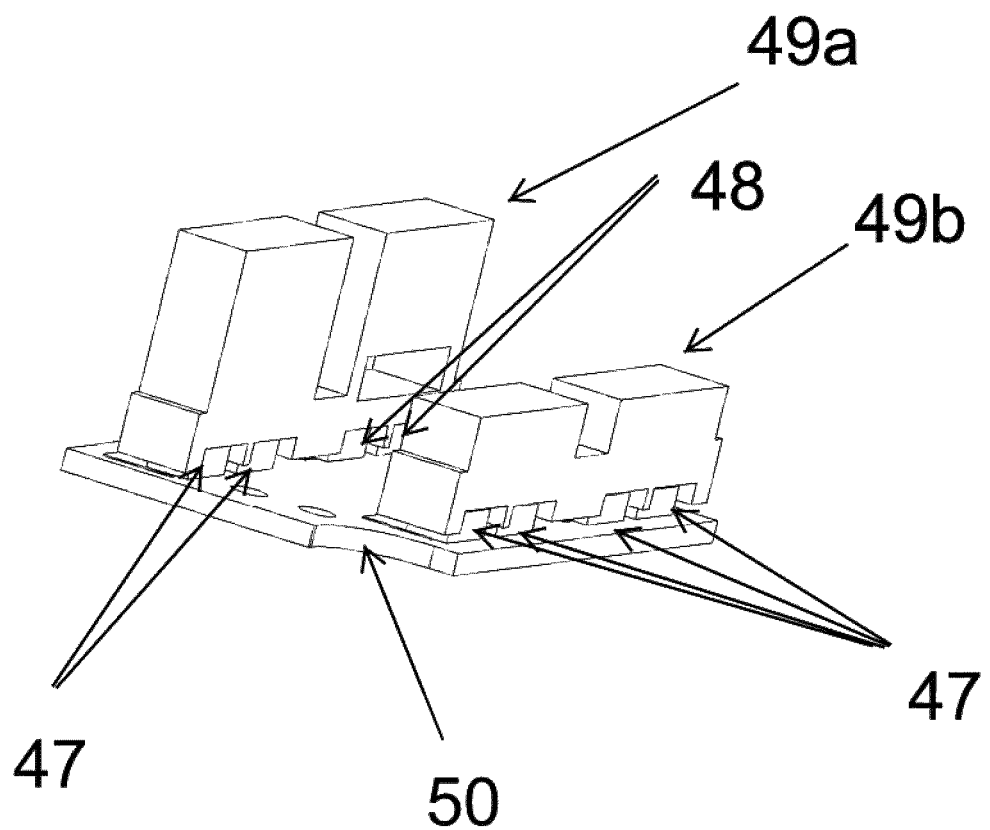
Figure 28:
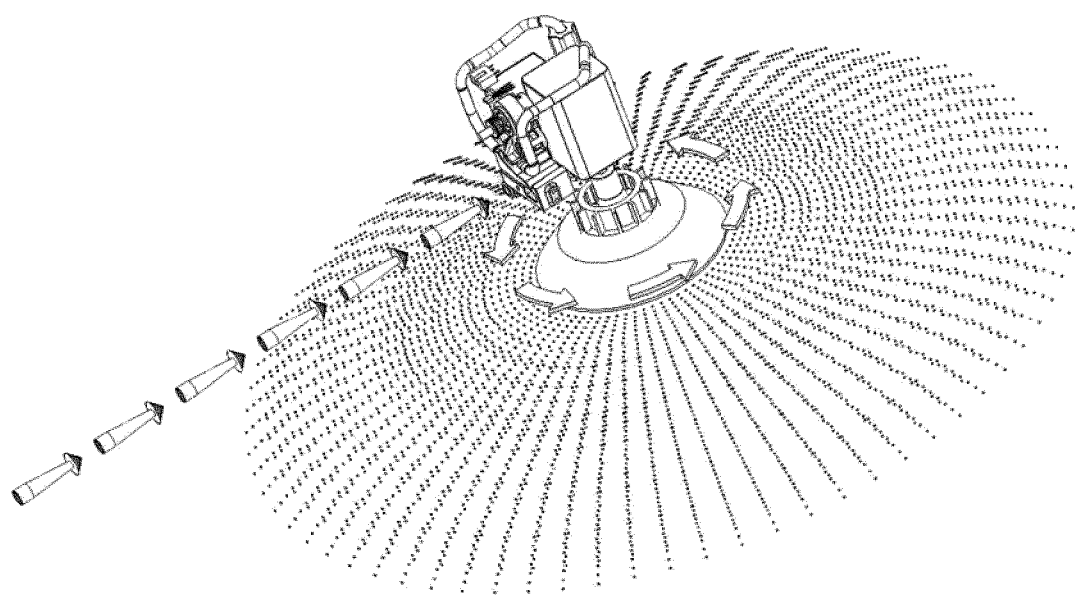
Figure 29:
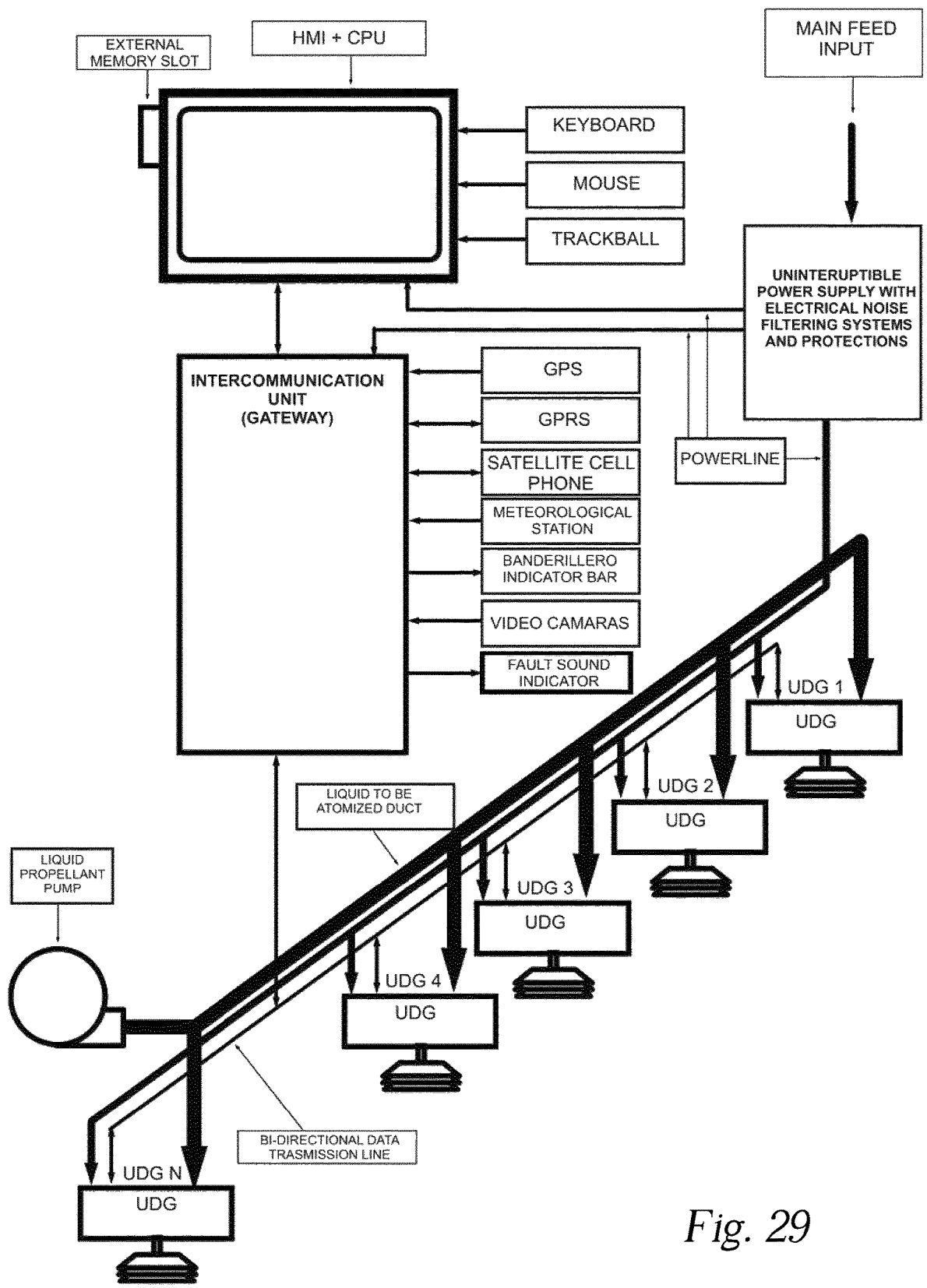
Figure 30:
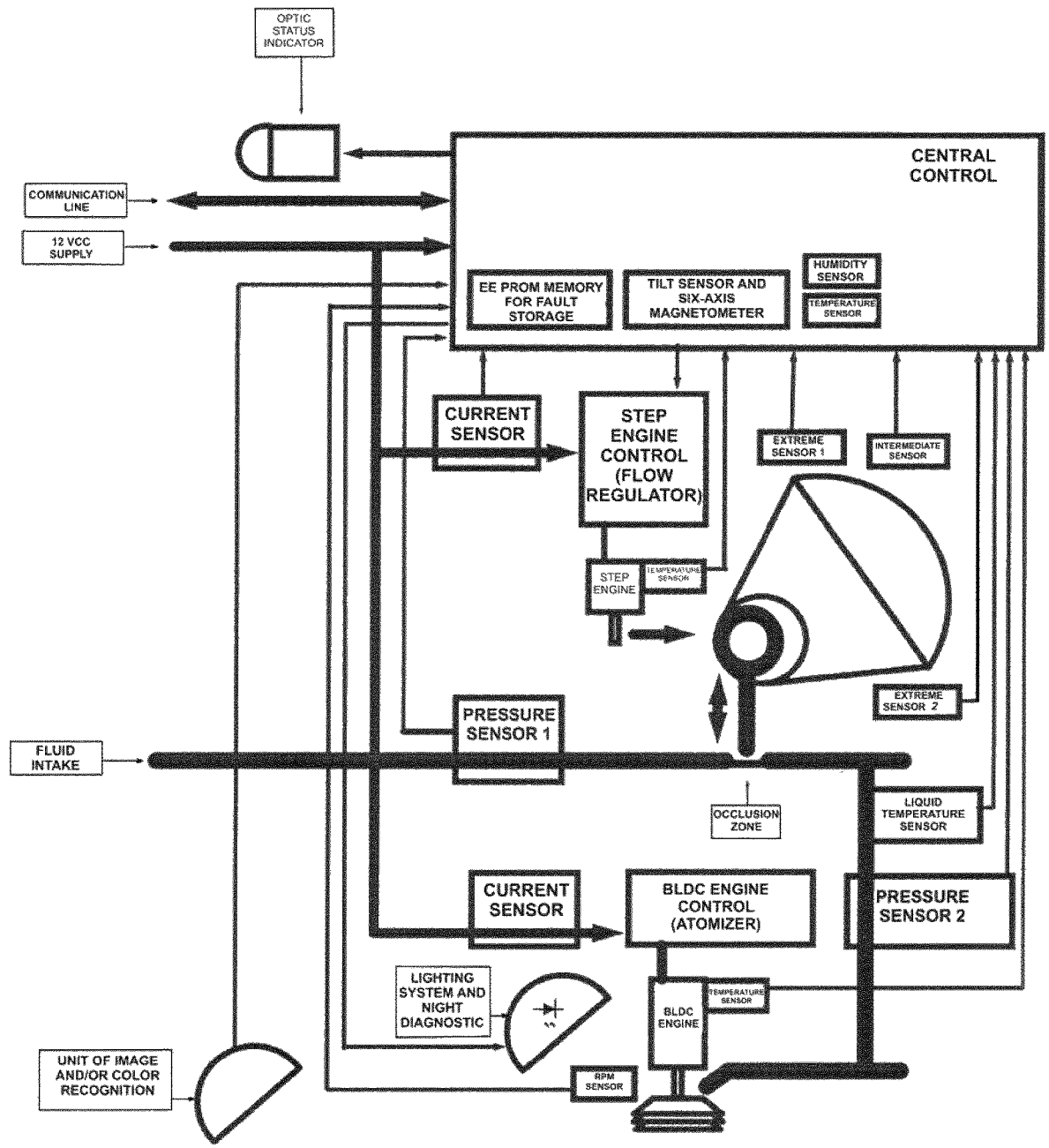
Figure 31:
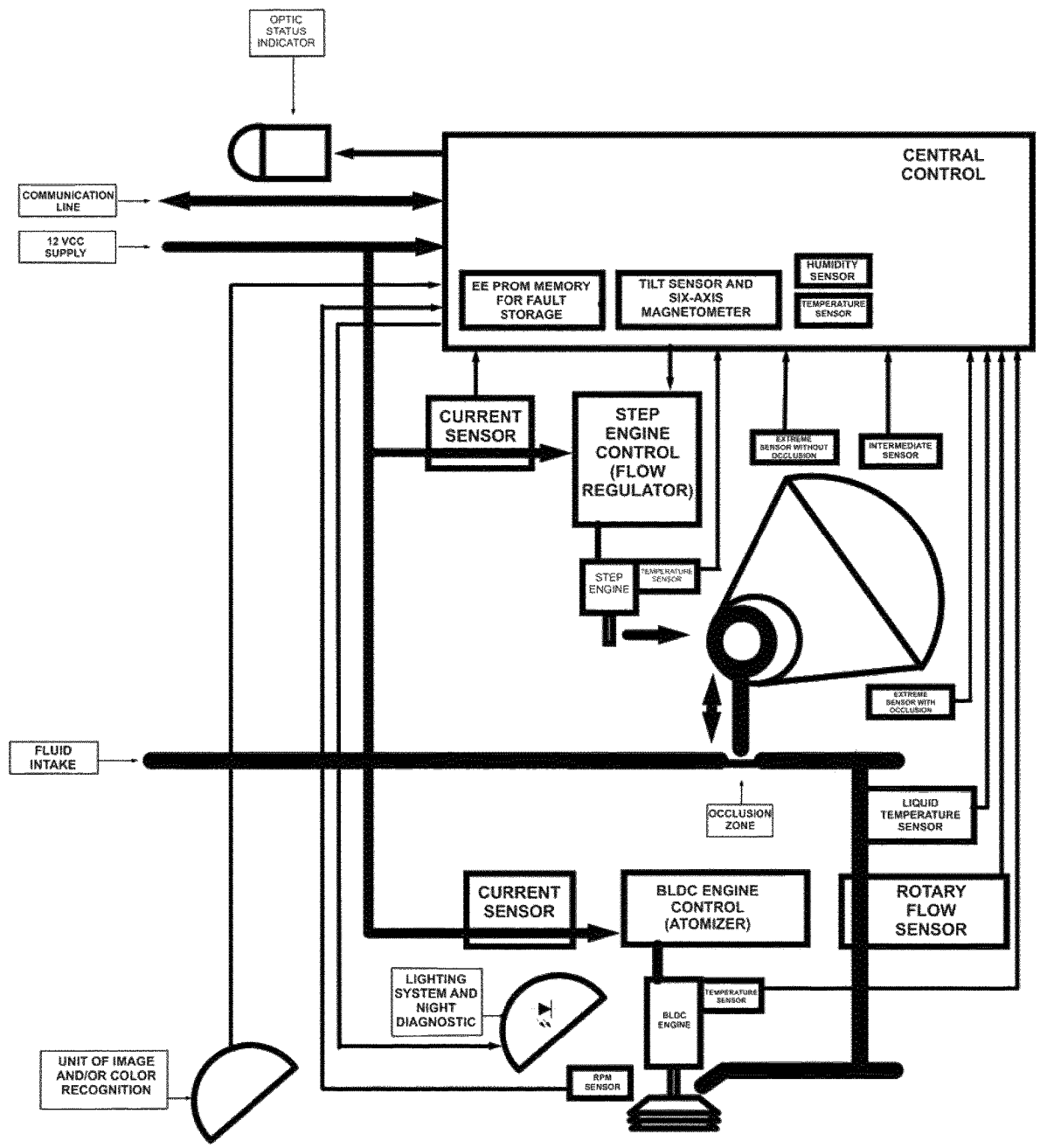

The rotor (29) is formed by a body of cylindrical form having a central opening 29d, an inner face 29e, an outer face 29f, a hollow central extension 29a protruding out from the central opening, a series of radial blades 29b, equidistant among them, located on the outer face of the rotor in order to block the liquid from entering into the area of the engine bearing (not shown), this is achieved due to the centrifugal effect of air through the blades. The blades form part of the concentric central body with the axis and external to it in annular form, inside it there is a liquid inlet duct (45) to the rotor at the height of the base FIG. 19). Where in its inner face 29e includes a series of inclined plane walls 29g, equidistant among them from a tapered shape form that ends in a cavity 29h between each wall, whereby the liquid moves due to the effect of the centrifugal force (FIG. 16). In such a way that it is prevented that the liquid ascends to the upper part, and the liquid is propelled downwards when crashing against the inclined plane walls, due to the effect of the combination of the centrifugal force and gravity, to the inclined plane of the wall, the descendent tapered shape form produces a Venturi effect, generating a low-pressure area that absorbs the liquid towards the outlet opening when it is in movement and in rotation (FIG. 28). The plate or disc (30 a, b, c, d) is mechanically linked in the bottom part of the rotor, when rotating at high speed the effect where the air layers next to the bottom surface of the plate are radially moved due to the effect of the centrifugal force takes place, generating a low-pressure area, causing that the liquid is radially moves without falling, as a layer over the bottom surface of the plate. Accordingly, the surface to be covered by this liquid layer increases when departing from the center. The effect of the surface tension of the liquid when exiting is sufficient to prevent that the liquid layer is separated in particles in the first stretch of the radial route over the surface, in the medium sector of the disc the mentioned layer suffers the separation into ligaments in radial form until finally the cohesive forces of the surface tension collapse while being exceeded by the disruptive forces of the centrifugation, separating into drops. Generating drops of uniform size, according to the model of Reynolds**. The edge of the disc (FIG. 18) slightly increases the uniformity of the drops.

Figure 12:
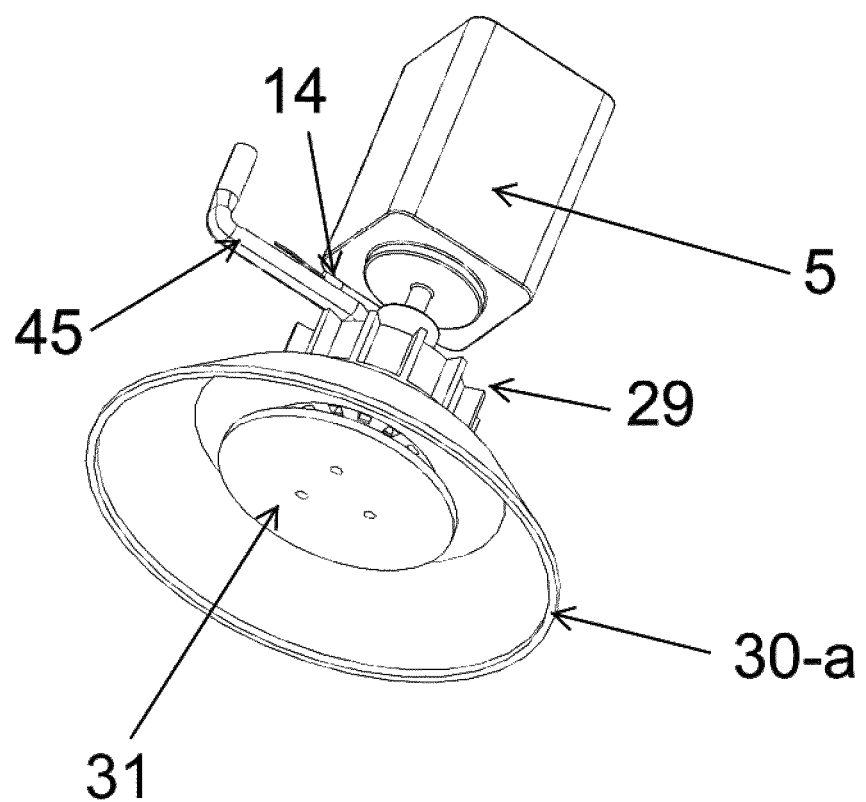
Figure 13:
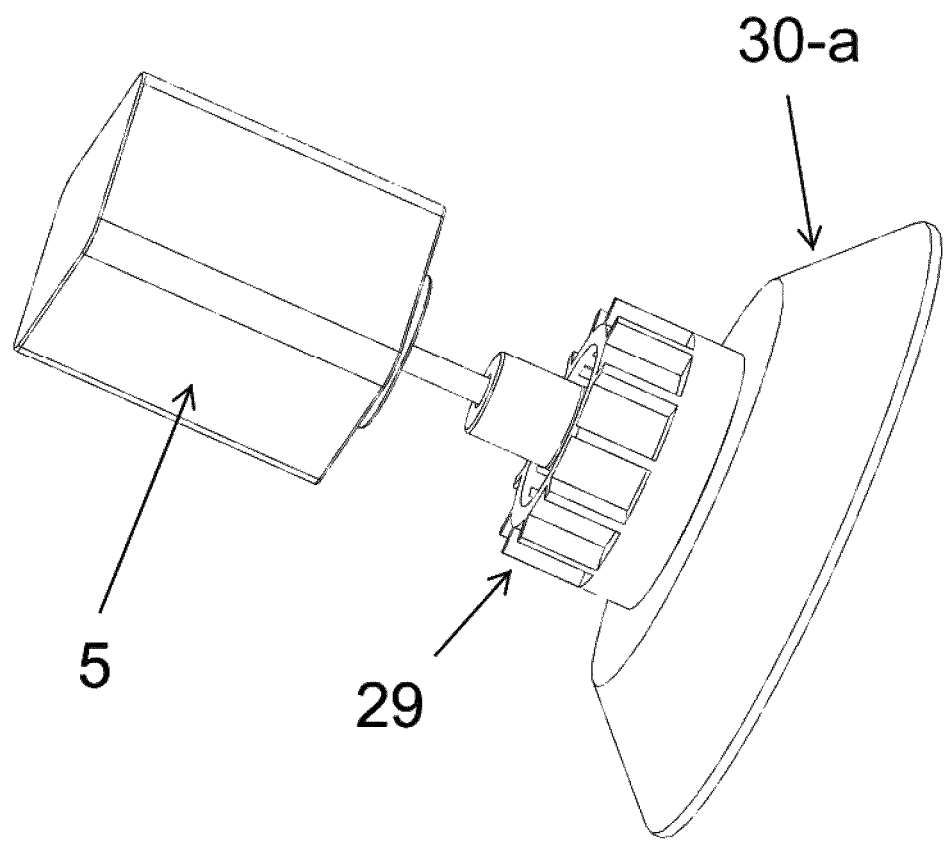
Figure 14:
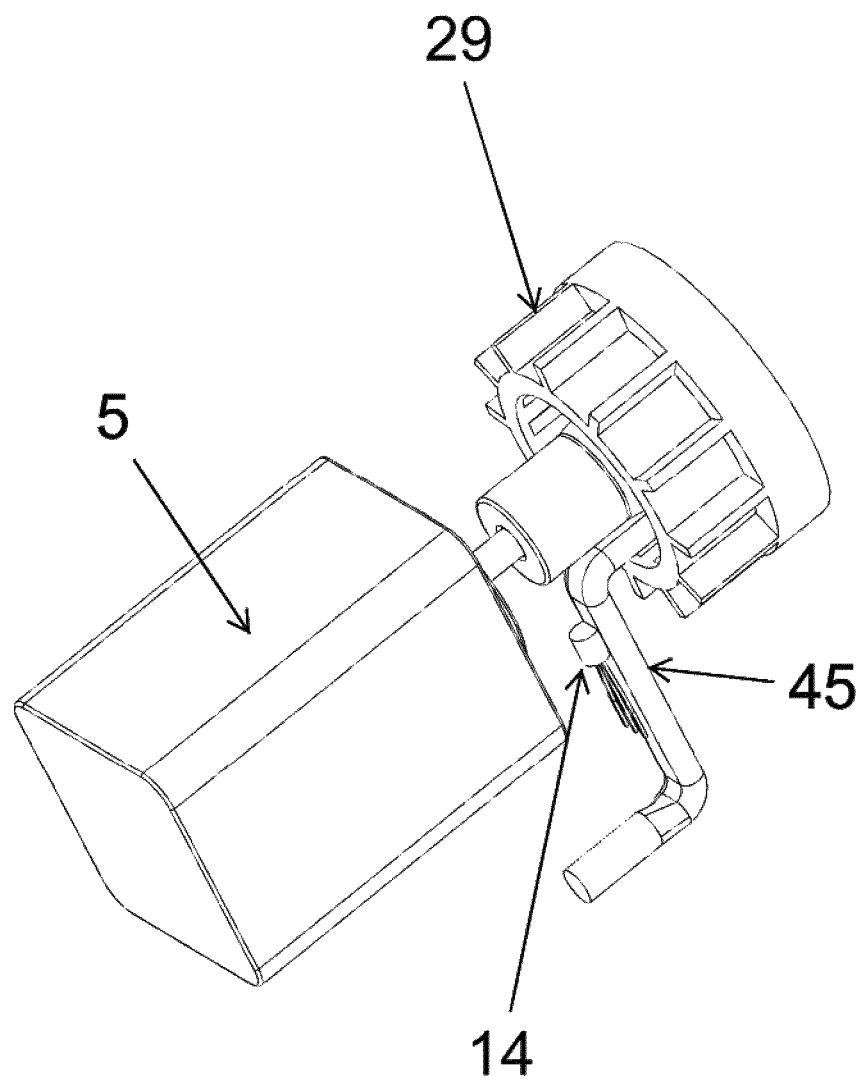
Figure 15:
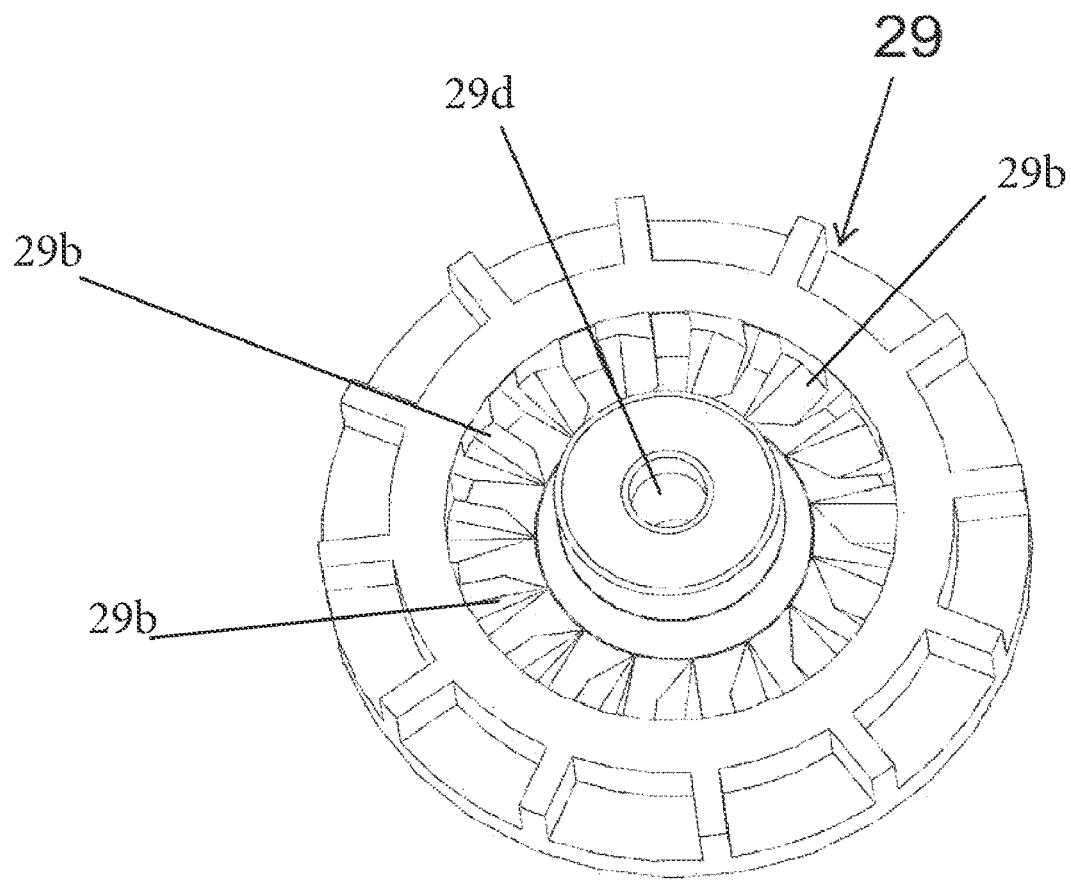

The rotating atomizer device includes a BLDC type (5) engine, the rotor (29), and at least one disc (30 a, b, c, d) according to FIG. 12 that rotates at high speed and a fluid that is deposited in the area next to their centers. The rotation produces a centrifugal effect that makes the liquid flow radially towards the disc periphery and finally abandon it incorporating itself in drop form to the surrounding gas (air).

Considering the speed acquired due to the fluid when moving away from the center of the disc, in fact the tangential speed is directly proportional to the distance to the center of rotation, the liquid layer that moves on the surface of the disc is separated first into filaments and finally the filaments are divided into drops following the proceedings described by Lord WS Rayleigh (On the Instability of Jets, Proceedings of the London Math. Soc. 1879).

One disc that rotates at high speed and with a fluid flow sufficiently low so that when the particles reach the periphery they have sufficient space to move away from each other, shall produce an aerosol in which the drop size is shown at a low dispersion.

The sizes of the generated drops will decrease with the increase of the rotation speed and shall increase with the increase of flow.

The operation principle of the centrifugal atomizers is based in the kinetic energy contribution due to centrifugation of the liquid of the particles to produce the disintegration of the liquid in small drops overcoming the combined cohesive effects of the surface tension, the viscosity and the density.

In order to comply with the premise of this model (Reynolds) it is necessary that the complete above-mentioned process occurs before the liquid abandons the plate. An excessive flow will generate that the separation process of the sheet into the ligaments and the further process of separation of the ligaments into drops, depart from the center. If any of these processes is so much departed from the center that it has to take place outside the plate, the uniformity of the drop size should be affected.

THEORETICAL FOUNDATION OF THE BREAKUP MECHANISM OF A COMPACT LIQUID INTO DROPS: According to Walton, H. W., and W. C. Prewett 1949. The production of sprays and mists of uniform drop size by means of spinning disc type sprayers. Proc. Phys. Soc. 62B:341-350, the diameter of the drops is a function of the size and rotation speed of the disc and of the density and the surface tension of the liquid according to what has been specified in the following formula:

$$D=(K/W)*(T/Pd)^{1/2}$$

Wherein:
D=diameter of the drops
K=dimentionless constant
W=angular speed
d=diameter of the disc
P=density
T=surface tension It has already been established that the drop size increased when the surface tension increased and it decreased when the rotation speed increased, the diameter of the disc, the density, being the greater dependence the one of the rotation speed, since the influence of the other involved variables is affected with a square rot (or power to 0.5). Dependence on viscosity or floe are not specified in this study.

Then, the Prof. Ichiro Tanasawa of the Production Science Department of the University of Tokyo in 1978, expanded the formula including flow and viscosity to the variables that determine the drop size.

$$SMD=KN \times (Td \times P)a \times (1+b \times Qd \times V)$$

SMD=drop diameter (m)
N=rotation speed (rps)
T=surface tension (kg/s2)
d=disc diameter (m)
P=density (kg/m3)

Q=flow (kg/seg)
V=dynamic viscosity (Kg/ms)
K=dimentionless constant (0.45)
a=dimentionless exponent (0.5)
b=dimentionless constant (0.003)

Establishing that the drops diameter increases when the flow increases and decreases when viscosity increases, even though low incidence is assigned to this influence.

In more than 4000 essays carried out in the laboratory, it has been discovered that even if the equation of Tanasawa correctly expresses the dependence of the drop size on the physical variables related both to the atomization process (rotation speed, disc diameter and flow) and on the physical properties of the liquid to be sprayed (density, surface tension and viscosity) as regards its direct or inverse proportionality, the original dimentionless coefficients are not suitable to represent what happens with the phytosanitary chemical products diluted in a low proportion of water, as is the case of the present disclosure.

To such effect, specific values suitable for the coefficients to dimensional K, a and b have been determined according to the chart of liquid or solid, diluted and/or emulsified products in a liquid vehicle of phytosanitary products.

At the same time, the flow value shall vary in each rotating atomizer device depending on the advancement conditions of the vehicle to which the boom that supports the rotating atomizer devices at an equidistant distance is fixed, in a way that it guarantees a uniform coverage of drops/cm2 in that transversal direction of travel of the vehicle.

As long as the vehicle advances at constant speed and in a constant direction and the dose to be applied stated (lts/ha) by the agronomic professional is uniform for all the surface to be treated, all the rotating atomizer devices will generate the drops at a unique flow per hour (lts/min or cm3/min) and at the same rotation speed of the atomizer discs.

In case the changes of speed without change of the direction of travel, all the rotating atomizer devices shall equally vary the flow per hour (lts/min or cm3/min) increasing speed increases and decreasing if speed decreases in order to maintain constant the prescribed hectare flow. These flow variations shall cause undesirable variations in the drop size unless the calculation system of the rotation atomizer devices, applying the Tanasawa equation with the dimentionless coefficients suitable for the particular mixture of agrochemicals and water that is being sprayed, recalculates the rotation speed such that the drops diameter is left unchanged.

In case of an agronomic prescription of variable dose, each one of the rotating atomizer devises with the knowledge of its boom location, the geographic position of the vehicle, its speed and the hectare flow prescribed for the geographic point over which sprinkle is taking place, shall determine the flow per hour to which the flow regulator shall be adjusted to comply with the prescription and shall calculate the rotation speed of the BLDC engine that propels the atomizer disc to comply with the drop size prescribed at each instant.

Figure 32:
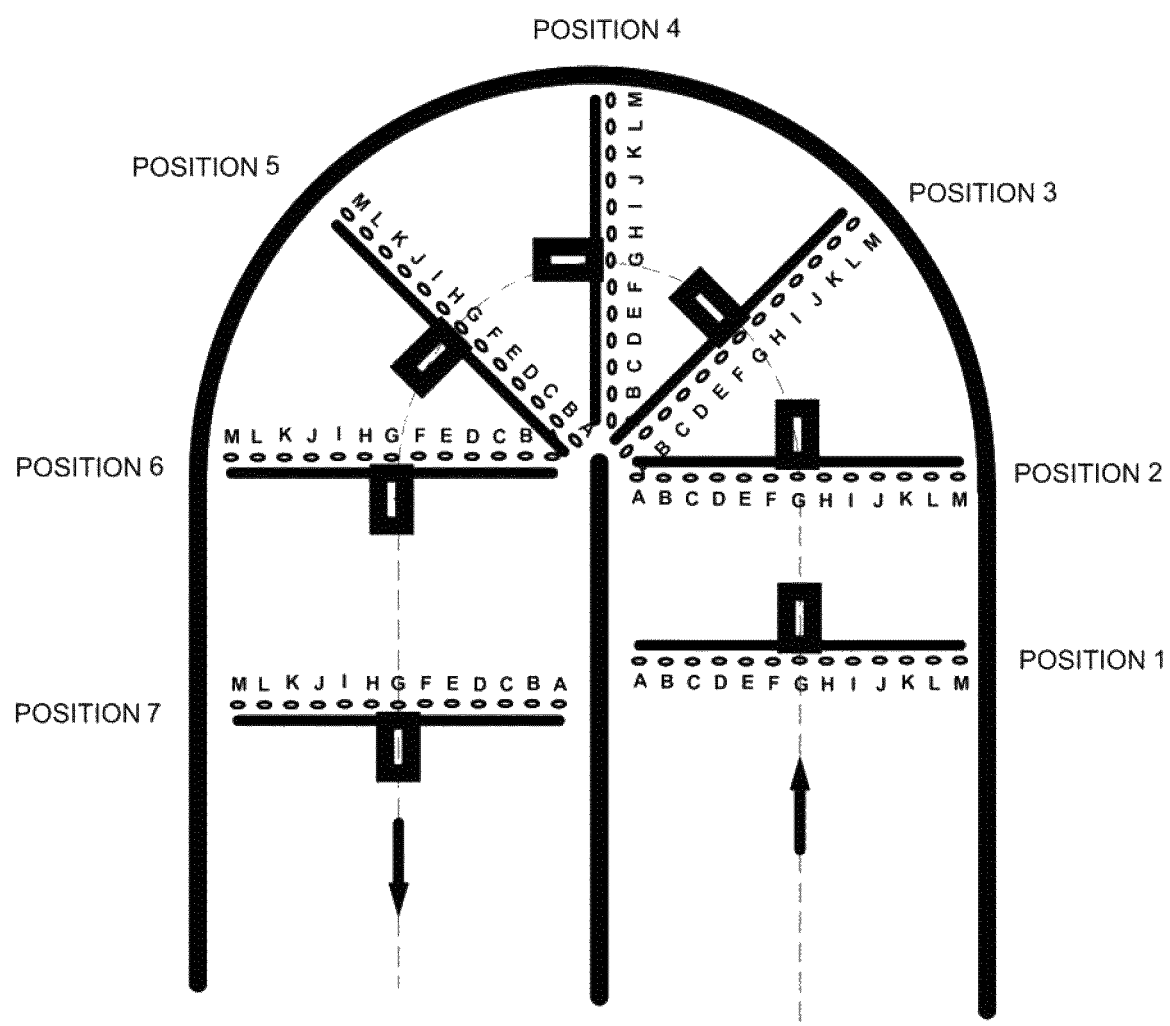
Figure 33:
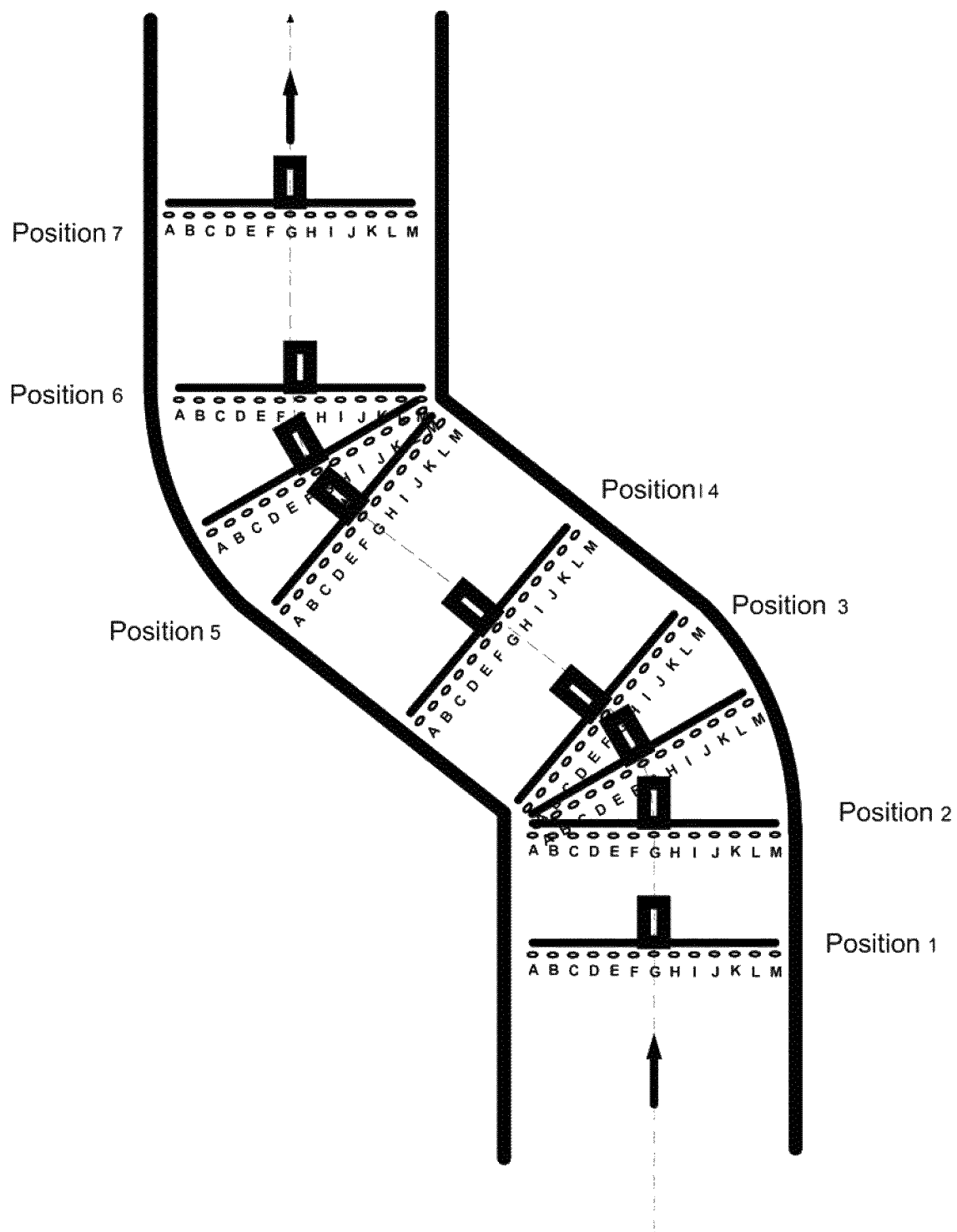
Figure 34:
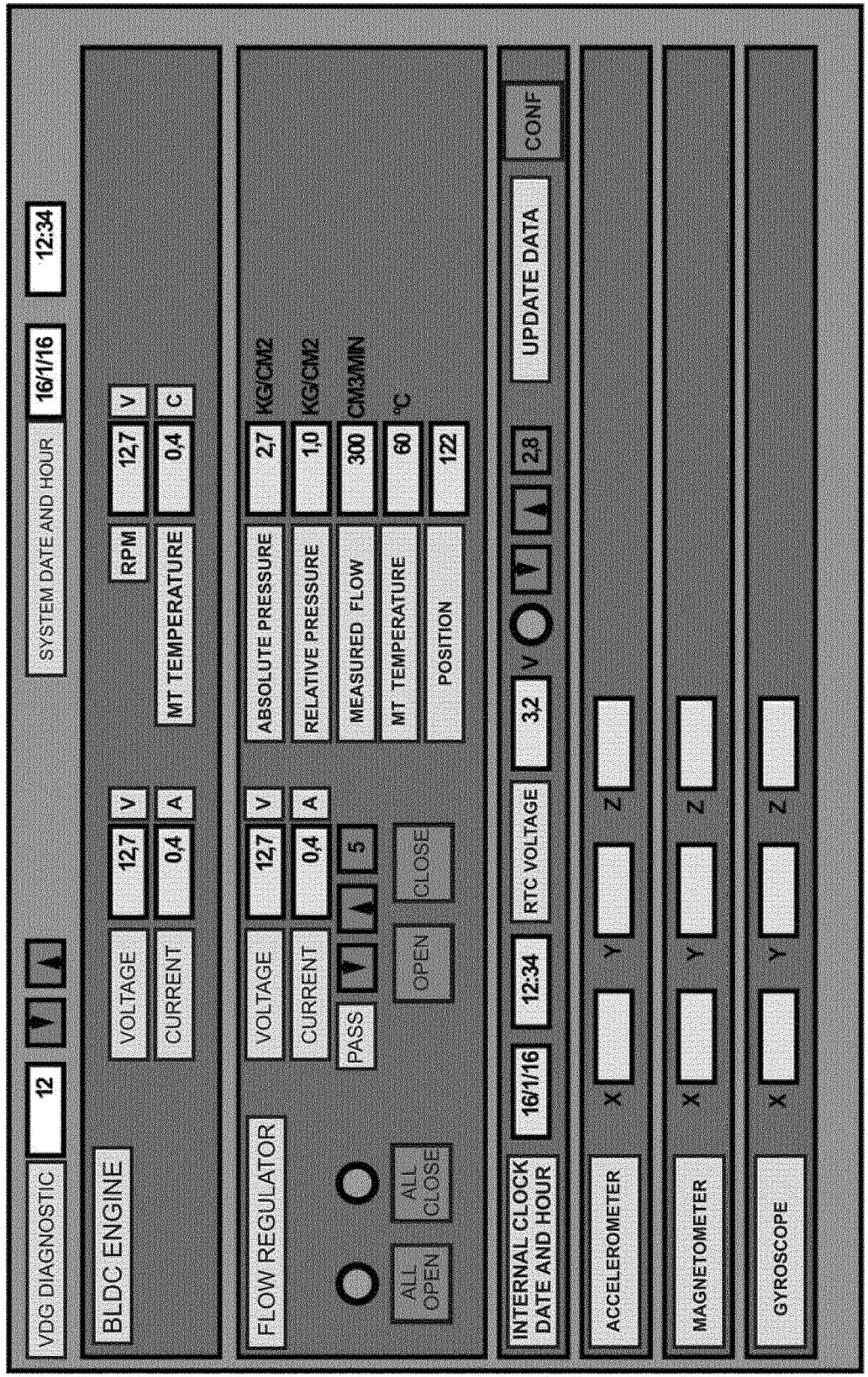

The same happens in light of changes of direction or when the vehicle rotates, FIG. 32 and FIG. 33, each one of the rotating atomizer devices having the information mentioned in prior paragraphs apart from the information of the sensors (accelerometer, magnetometer and gyroscope) shall determine the individual speed regarding the ground and as a consequence shall recalculate at each instant the flow per hour and the rotation speed necessary to comply with the hectare flow and the drop size prescribed.

The surface tension, the viscosity and the density shall vary with the temperature. An example of this situation considering that the duct (usually metallic and exposed to the sun) and a set of equidistant rotating atomizer devises mounted over the boom. If we call the duct section "S", the separation between the rotating atomizer devices "d", and the duct temperature "Tc" and the flow of each rotating atomizer device "q", and we further call "T 1", "T 2", ... "Tn" to the successive outlet temperatures of each rotating atomizer device, called "v 1", "v 2", ... "vn" to the speeds of each route we shall have: in the first route the flow that travels through the duct shall be "qt 1=q×n" and the speed shall arise from dividing the flow "v 1=(q×n)/s" and the liquid shall remain in the duct for a time t 1=d/v 1, replacing v 1 for its equivalent t 1=(d×s)/(q×n). In the last route the flow traveling through the duct shall only be "q" and the speed shall arise from the division of the flow "v 1=q/s" and the time it delays in travelling this last route shall be tn=(d×s)/q. Comparing both situations it is possible to observe that with only the comparison of the first and the last route, the liquid that supplies the first rotating atomizer device, shall be exposed to the heat transference for a notoriously small period of time than the last segment, but furthermore the liquid that supplies the last rotating atomizer device had not only received the heat contribution as segment n was travelled, but this last one shall de added to the heat contributions received in each of the prior segments through which it has passed. The temperature of the liquid that supplies each one of the rotating atomizer devices uniformly distributed along the boom shall be different and increasing towards the far away extreme. Each one of the rotating atomizer devices through the temperature sensor of the liquid attached to the outlet duct shall measure the instant temperature and shall recalculate the viscosity, density and surface tension applying variation tables of these parameters with the temperature for the spray liquid in particular that is being sprayed, to finally recalculate the rotation speed that shall maintain the drop size unchanged using the equation and the described tables.

Having specifically described and determined the nature of the present invention and the way in which it has been carried out, we claim the following as exclusive property and right:

1. A rotating atomizer device used for the land spraying of liquid phytosanitary products for agriculture, through the use of dragging or self-propelled machines, the device comprising:
   a main frame including an engine, a flow regulator, a rotor, a position and speed control medium, a lighting device, a sound platelet, a magnetometer integrated circuit, an accelerometer integrated circuit, a gyroscope integrated circuit, a communication, processing and control platelet;
   wherein said rotor incudes a cylindrical body having a central opening, an inner face, an outer face, a base, a perforated face located opposite to the base, a hollow central extension protruding out from the central opening, a plurality of equidistant radial blades located on the outer face, and a liquid inlet duct connected to the base of the cylindrical body of the rotor, a plurality of inclined walls located on the inner face;
   the inclined walls are tapered from the inner face towards the central opening forming a channel between each wall, the rotating atomizer device is mounted on the main frame;
   wherein a cup shaped plate has a base and an open end, the base includes a central hole having a first side connected to the perforated face of the rotor, the cup shaped plate is oriented vertically with regards to the perforated face and the open end includes an inward facing edge;

a cap connected to a second side to the central hole of the cup shaped plate, the cap includes a plurality of radially arranged inserts, the plurality of inserts of the cap coincide with a plurality of channels of a rotor separator;

wherein when the rotor rotates, the liquid is propelled downwards crashing against the inclined walls, due to the effect of centrifugal force and gravity producing a venturi effect that generates a low pressure that absorbs the liquid towards the plurality of inserts of the cap, the liquid radially moves as a liquid layer towards a first section of the cup shaped plate, then because of the surface tension, the liquid layer separates into ligaments and radially moves towards a middle section of the cup shaped plate, and the ligaments collapse into drops as the ligaments radially move to the inward facing edge of the cup shaped plate;

wherein the drops have a uniform size.

2. The device according to claim 1, wherein said at least one engine is a STEP engine.

3. The device according to claim 1, wherein said at least one engine is a BLDC type engine.

4. The device according to claim 1, further comprising an operator panel and at least one unit for drop generation.

5. A rotating atomizer device used for the land spraying of liquid phytosanitary products for agriculture, through the use of dragging or self-propelled machines, the device comprising:

a main frame including an engine, a flow regulator, a rotor, a position and speed control medium, a lighting device, a sound platelet, a magnetometer integrated circuit, an accelerometer integrated circuit, a gyroscope integrated circuit, a communication, processing and control platelet;

wherein said rotor incudes a cylindrical body having a central opening, an inner face, an outer face, a base, a perforated face located opposite to the base, a hollow central extension protruding out from the central opening, a plurality of equidistant radial blades located on the outer face, and a liquid inlet duct connected to the base of the cylindrical body of the rotor, a plurality of inclined walls located on the inner face;

the inclined walls are tapered from the inner face towards the central opening forming a channel between each wall, the rotating atomizer device is mounted on the main frame; wherein a cup shaped plate has a base and an open end, the base includes a central hole having a first side connected to the perforated face of the rotor, the cup shaped plate is oriented vertically with regards to the perforated face and the open end includes an inward facing edge;

a cap connected to a second side to the central hole of the cup shaped plate, the cap includes a plurality of radially arranged inserts, the plurality of inserts of the cap coincide with a plurality of channels of a rotor separator;

wherein when the rotor rotates, the liquid is propelled downwards crashing against the inclined walls, due to the effect of centrifugal force and gravity producing a venturi effect that generates a low pressure that absorbs the liquid towards the plurality of inserts of the cap, the liquid radially moves as a liquid layer towards a first section of the cup shaped plate, then because of the surface tension, the liquid layer separates into ligaments and radially moves towards a middle section of the cup shaped plate, and the ligaments collapse into drops as they radially move to the inward facing edge of the cup shaped plate;

wherein the cup shaped plate has a striped inner side;

wherein the drops have a uniform size.

* * * * *